United States Patent
Yamaguchi et al.

(10) Patent No.: US 7,362,485 B2
(45) Date of Patent: Apr. 22, 2008

(54) IMAGE DISPLAY MEDIUM, IMAGE WRITING DEVICE, AND IMAGE FORMING APPARATUS

(75) Inventors: Yoshiro Yamaguchi, Kanagawa (JP);
Yoshinori Yamaguchi, Kanagawa (JP);
Takayuki Takeuchi, Kanagawa (JP);
Takashi Ozawa, Kanagawa (JP);
Shigehiko Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/723,728

(22) Filed: Mar. 21, 2007

(65) Prior Publication Data

US 2008/0030830 A1    Feb. 7, 2008

(30) Foreign Application Priority Data

Aug. 2, 2006  (JP)  ............... 2006-210522

(51) Int. Cl.
*G02B 26/08*  (2006.01)
*G02F 1/13*   (2006.01)

(52) U.S. Cl. ............ 359/201; 359/202; 359/212; 359/245; 359/254; 359/265; 359/298; 359/315; 359/316; 359/318; 359/320; 349/2; 349/3; 349/4; 349/139; 349/143; 349/149; 349/155; 349/156; 349/158; 349/160; 349/201; 349/202

(58) Field of Classification Search ............ 359/201, 359/202, 212, 245, 251–259, 265–275, 298, 359/315–320; 349/2–4, 41–43, 84, 139, 349/143, 149, 155, 156, 158, 160, 201, 202
See application file for complete search history.

(56) References Cited

U.S. PATENT DOCUMENTS 4,146,876 A * 3/1979 Arellano et al. ............ 345/105
4,449,125 A * 5/1984 Clerc et al. ................. 345/87
4,766,428 A * 8/1988 Clerc et al. ................. 349/143
5,076,667 A * 12/1991 Stewart et al. .............. 349/139
5,838,411 A * 11/1998 Hayakawa et al. ......... 349/139
5,847,797 A * 12/1998 Van Dijk .................... 349/158
6,049,368 A * 4/2000 Song .......................... 349/139
6,292,249 B1 * 9/2001 Kane et al. ................. 349/155
6,424,092 B1 * 7/2002 Odake et al. ............... 345/80

(Continued)

FOREIGN PATENT DOCUMENTS

JP    A 2005-352481    12/2005

*Primary Examiner*—Evelyn A. Lester
(74) *Attorney, Agent, or Firm*—Oliff & Berridge, PLC

(57) ABSTRACT

An image display medium comprising: a display layer; a pair of substrates that retain the display layer therebetween, with at least parts of the pair of substrates configuring a frame portion to which an electrical connection connector for electrical connection to the outside connects, and with at least one of the pair of substrates being transparent; a first scan electrode group; a second scan electrode group; a first electrical contact group; a second electrical contact group; a first connection wire group; and a second connection wire group, wherein the first electrical contact group and the second electrical contact group are disposed apart from each other a distance that is greater than the distance between two mutually adjacent contacts belonging to the first electrical contact group or the second electrical contact group along at least one of a thickness direction and a surface direction of the pair of substrates, is provided.

14 Claims, 25 Drawing Sheets

U.S. PATENT DOCUMENTS 6,700,562 B1 * 3/2004 Knapp et al. .................. 345/98
6,853,361 B2 * 2/2005 Tsuyuki et al. ................ 345/92
6,963,384 B2 * 11/2005 Hagiwara ................... 349/148
2004/0027527 A1 * 2/2004 Pai .............................. 349/149
2004/0105064 A1 * 6/2004 Hagiwara ................... 349/149
2005/0271979 A1 12/2005 Lee et al.

* cited by examiner

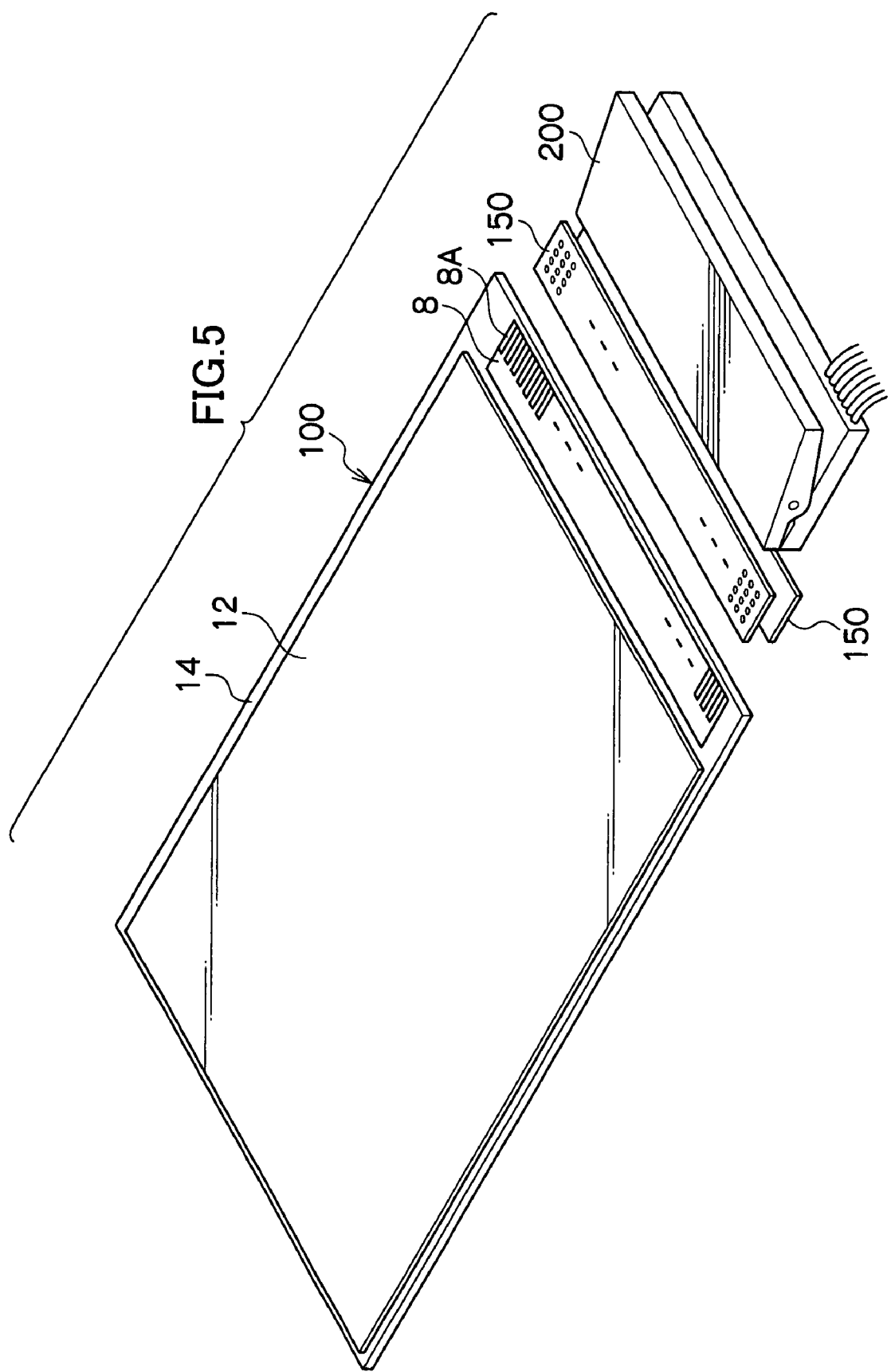

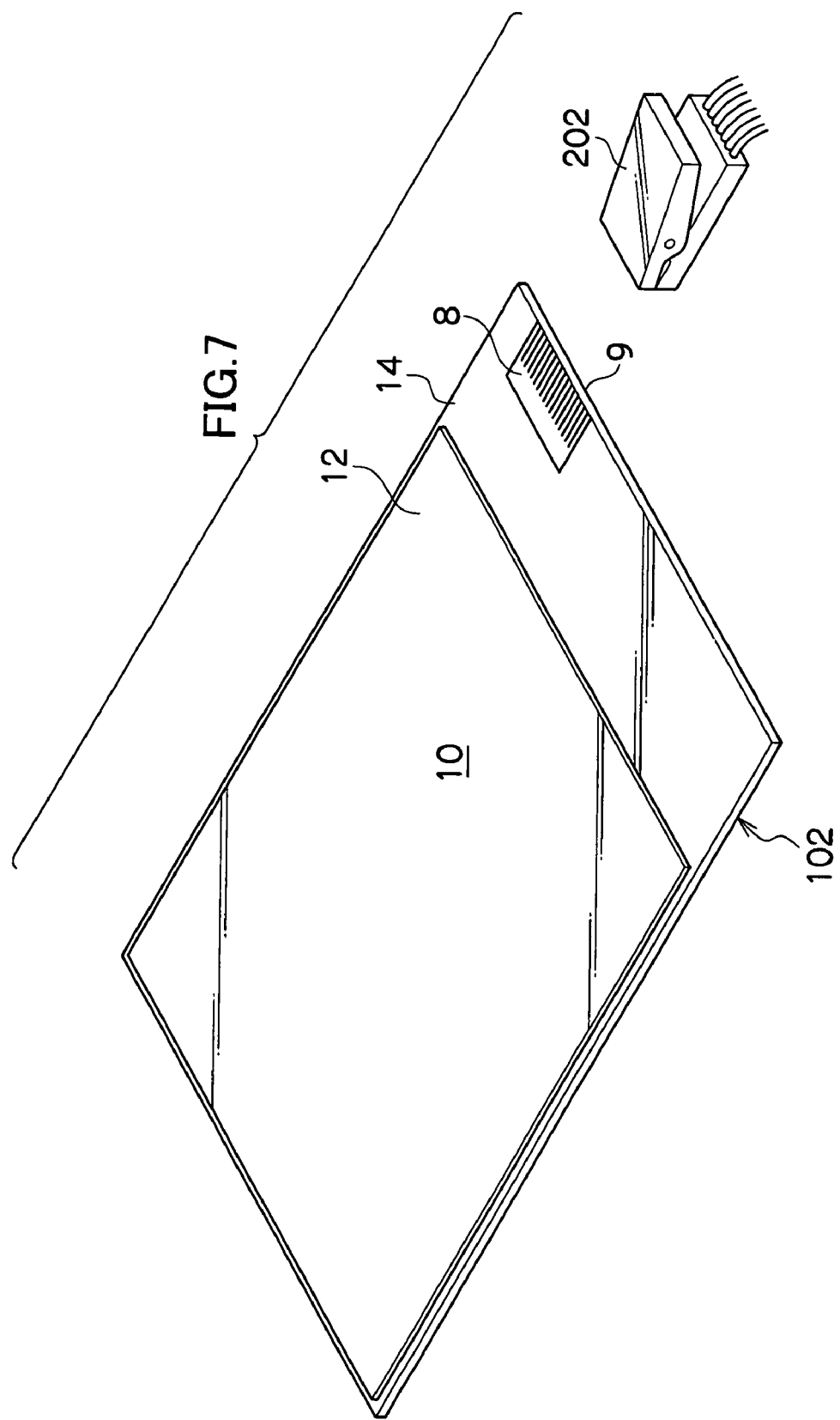

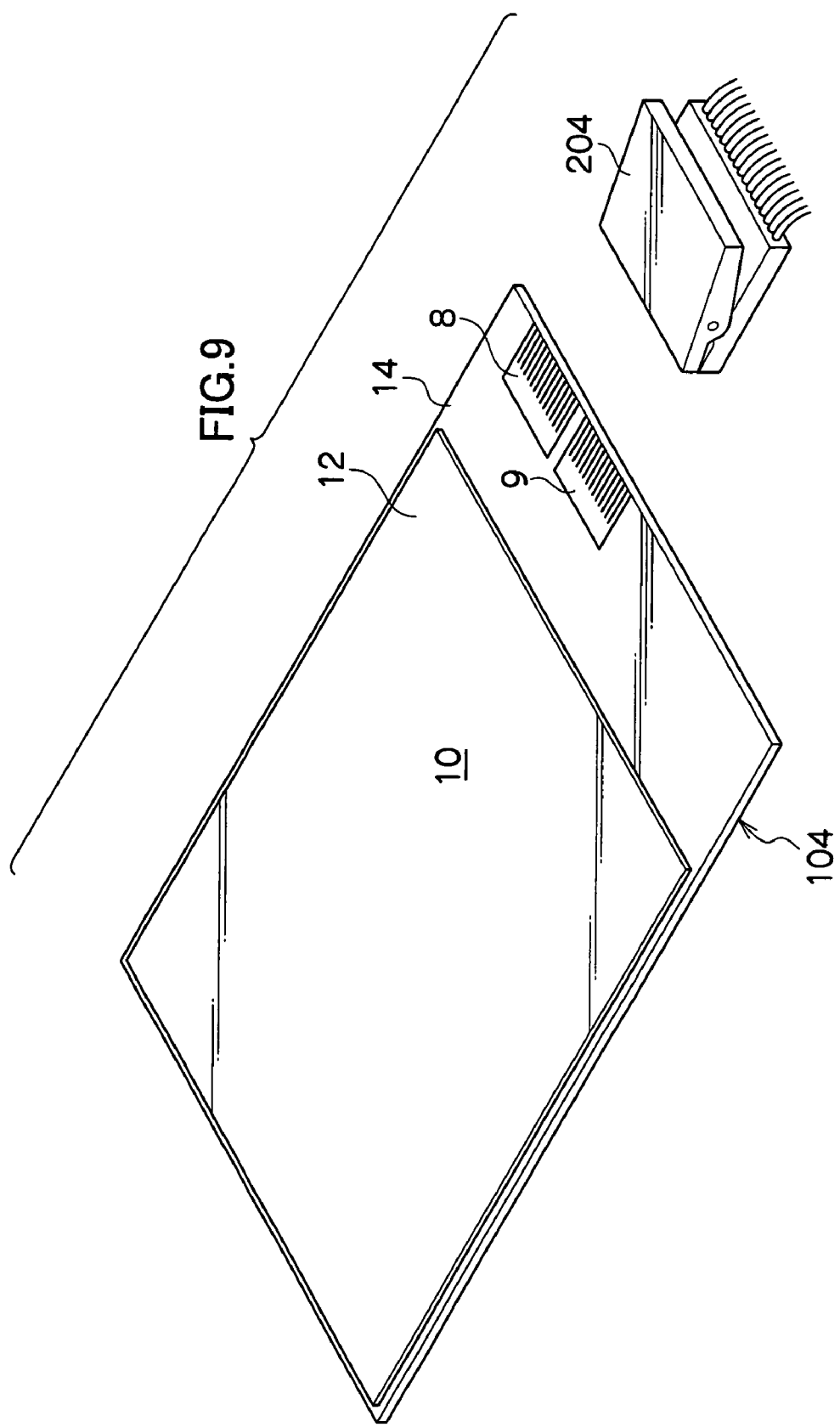

FIG.23A
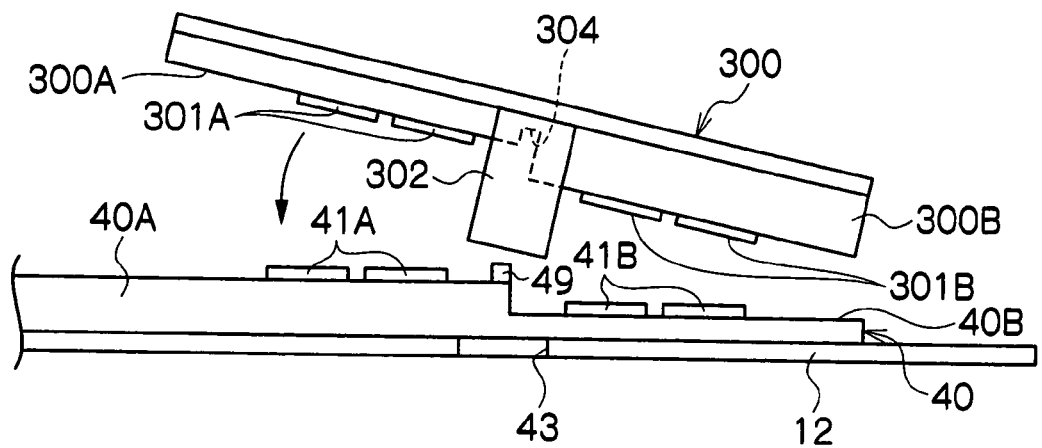
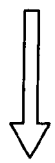
FIG.23B
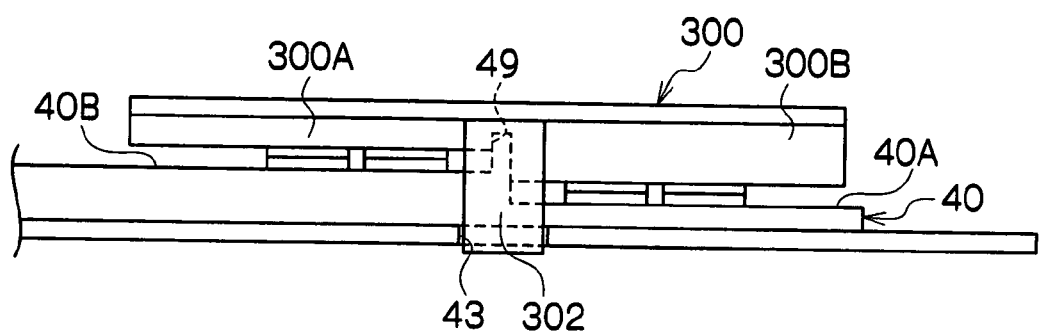

ID_DISPLAY MEDIUM, IMAGE
WRITING DEVICE, AND IMAGE FORMING
APPARATUS

CROSS-REFERENCE TO RELATED APPLICATIONS

This application is based on and claims priority under 35 USC 119 from Japanese Patent Application No. 2006-210522 filed on Aug. 2, 2006.

BACKGROUND

1. Technical Field

The present invention relates to an image display medium, and image writing device, and an image forming apparatus.

2. Related Art

Electronic paper comprising an upper substrate on which row electrodes are formed, a lower substrate on which column electrodes are formed, a display layer disposed between the upper substrate and the lower substrate, and a frame-like structure disposed around the display layer is disclosed. Plural light receiving elements connected to the electrodes are arranged on a frame-like region on the front surface of the electronic paper or on the back surface. A writing device disposed with light emitting elements (LEDs) on an inside surface is attached to the electronic paper such that the writing device clips the portion of the electronic paper where the light receiving elements are disposed. Additionally, by selectively causing the plural LEDs to emit light, the writing device selects electrodes of the electronic paper and causes the electronic paper to display an image.

Here, in order to utilize an image display as an information display medium, a resolution of several tens to several hundreds of dots per inch is required. For this reason, in a conventional image display such as a liquid crystal display, a image selection drive circuit such as a scan IC or a data IC is disposed on a substrate integrated with a display element, an image signal is transmitted to the scan IC or the data IC through a common wire from the outside, and the transmitted image signal is processed by the scan IC or the data IC to control the pixels such that the pixels are switched ON and OFF. Thus, it has been possible to reduce the number of wires disposed in a connector portion to correspond to a predetermined number of bits (16 bits or 32 bits) becoming the common wire.

The present invention provides an image display medium such as electronic paper that is used by connecting a writing device including a image selection drive circuit thereto and which enables detachable, highly reliable electrical connector connection, a writing device used for the image display medium, and an image forming apparatus configured by the image display medium and the writing device.

SUMMARY

According to an aspect of the invention, there is provided an image display medium comprising: a display layer including a display region whose display state changes by electrical action; a pair of substrates that retain the display layer therebetween, with at least parts of the pair of substrates configuring a frame portion to which an electrical connection connector for electrical connection to the outside connects, and with at least one of the pair of substrates being transparent; a first scan electrode group that is a group of electrodes disposed across the overall display region along a column direction of the display region on the surface of one of the pair of substrates facing the display layer; a second scan electrode group that is a group of electrodes disposed across the overall display region along a row direction of the display region on the surface of the other of the pair of substrates facing the display layer; a first electrical contact group disposed at a place on the pair of substrates to which the electrical connection connector connects; a second electrical contact group disposed at a place on the pair of substrates to which the electrical connection connector connects; a first connection wire group that electrically connects the first electrical contact group and the first scan electrode group to each other; and a second connection wire group that electrically connects the second electrical contact group and the second scan electrode group to each other, wherein the first electrical contact group and the second electrical contact group are disposed apart from each other a distance that is greater than the distance between two mutually adjacent contacts belonging to the first electrical contact group or the second electrical contact group along at least one of a thickness direction and a surface direction of the pair of substrates.

BRIEF DESCRIPTION OF THE DRAWINGS

Exemplary embodiments of the present invention will be described in detail based on the following figures, wherein:

FIG. 5 is a perspective diagram showing the relative positional relationship between a clip portion that inputs a signal from an image writing device and the image display medium pertaining to the first exemplary embodiment;

FIG. 7 is a perspective diagram showing the relative positional relationship between a clip portion that inputs a signal from an image writing device and the image display medium pertaining to the second exemplary embodiment;

FIG. 9 is a perspective diagram showing the relative positional relationship between a clip portion that inputs a signal from an image writing device and the image display medium pertaining to the third exemplary embodiment;

FIG. 23A is an explanatory diagram showing the connector shown in FIG. 22A and FIG. 22B being connected to the connection terminal;

FIG. 23B is an explanatory diagram showing the connector shown in FIG. 22A and FIG. 22B being connected to the connection terminal;

DETAILED DESCRIPTION

First Exemplary Embodiment

Figure 1A:
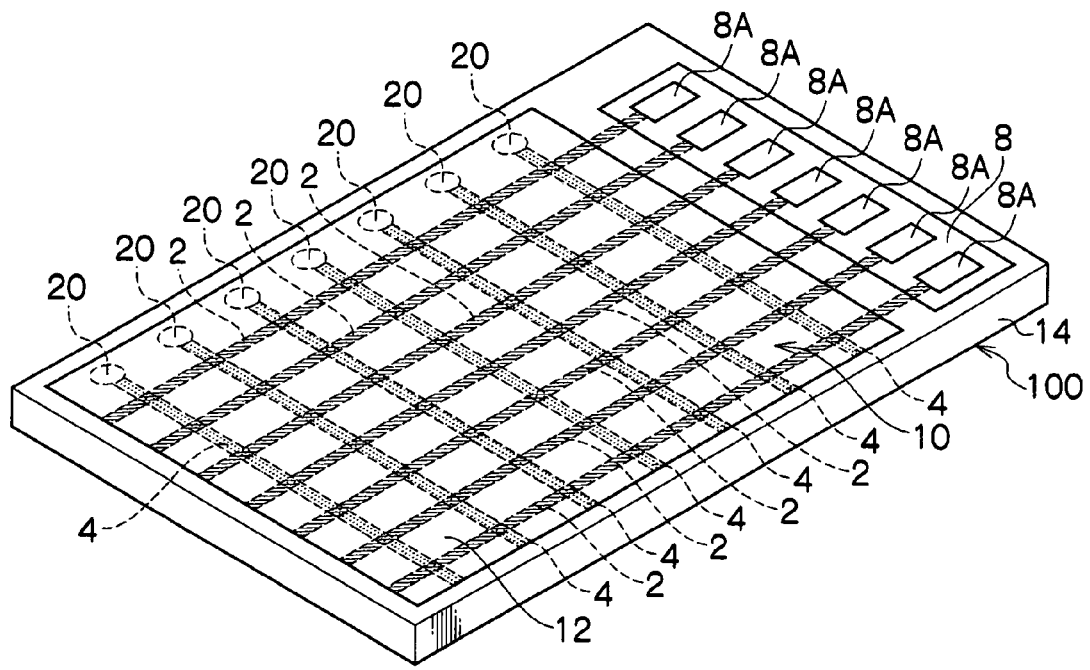
FIG. 1A is a perspective diagram showing the configuration of an image display medium pertaining to a first exemplary embodiment seen from a front side.
Figure 1B:
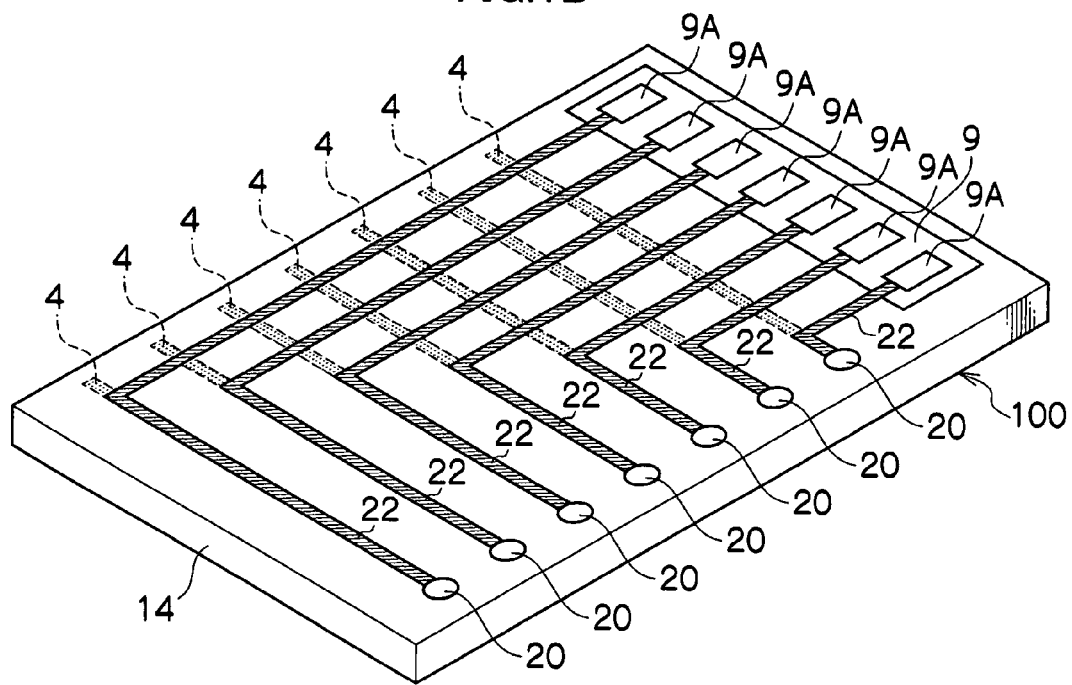
FIG. 1B is a perspective diagram showing the configuration of the image display medium pertaining to the first exemplary embodiment seen from a back side.

As shown in FIG. 1A and FIG. 1B, an image display medium 100 pertaining to a first exemplary embodiment is shaped like a sheet or a thin plate and includes: a display region 10 disposed on one surface and in which an image is displayed; column electrodes 2 disposed parallel to each other along a column direction of the display region 10; row electrodes 4 disposed parallel to each other along a row direction of the display region 10; a first connection terminal 8 that is disposed on the side where the display region 10 is disposed—that is, the front side—and to which the column electrodes 2 are connected; and a second connection terminal 9 that is disposed on the surface on the opposite side of the first connection terminal 8 and to which the row electrodes 4 are connected. The group of column electrodes 2 configures a first scan electrode group of the present invention, and the group of row electrodes 4 configures a second scan electrode group of the present invention. It will be noted that FIG. 1A shows the image display medium 100 from the front side and FIG. 1B shows the image display medium 100 from the back side. It will also be noted that it is not invariably necessary for the column electrode group and the row electrode group to be orthogonal to each other and that it suffices for the column electrode group and the row electrode group to configure matrix wires capable of operating the display region.

Figure 2:
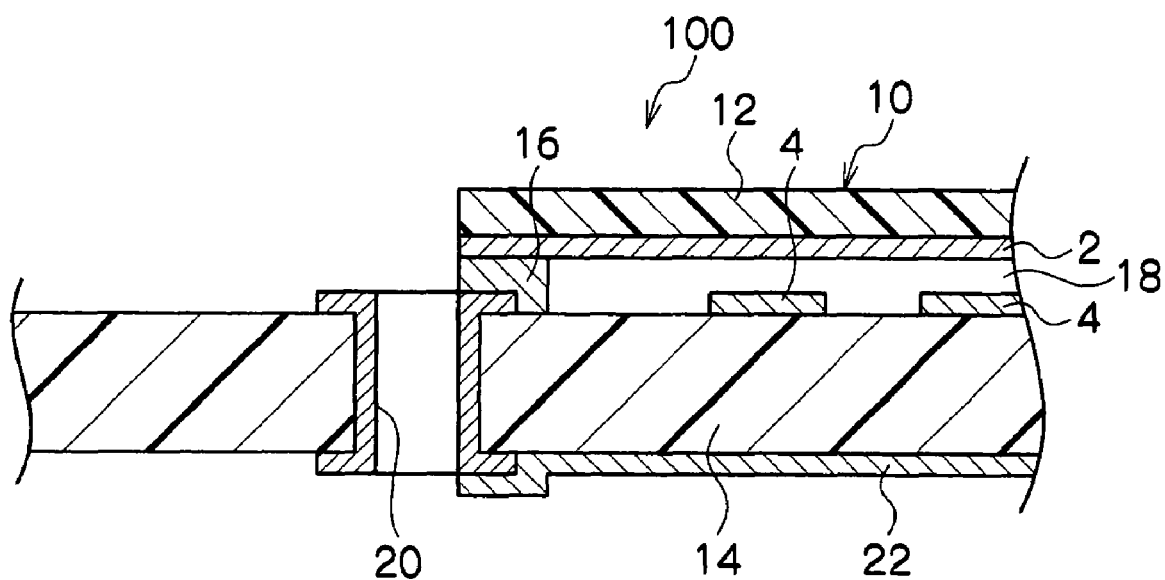
FIG. 2 is a cross-sectional diagram showing the cross section of the image display medium pertaining to the first exemplary embodiment cut along column electrodes.
Figure 3:
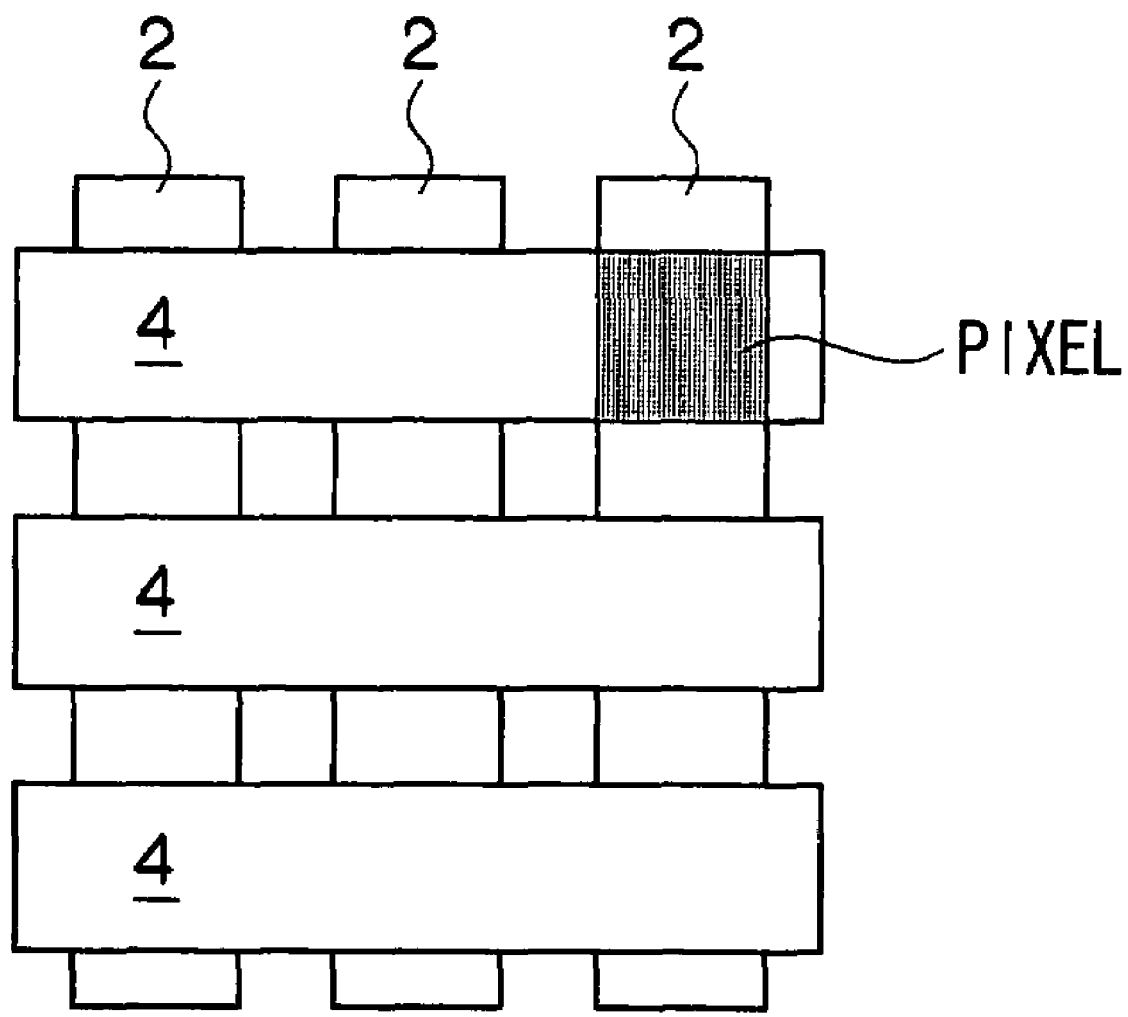
FIG. 3 is an explanatory diagram showing an example of the principle by which the image display medium pertaining to the first exemplary embodiment displays an image.
Figure 4:
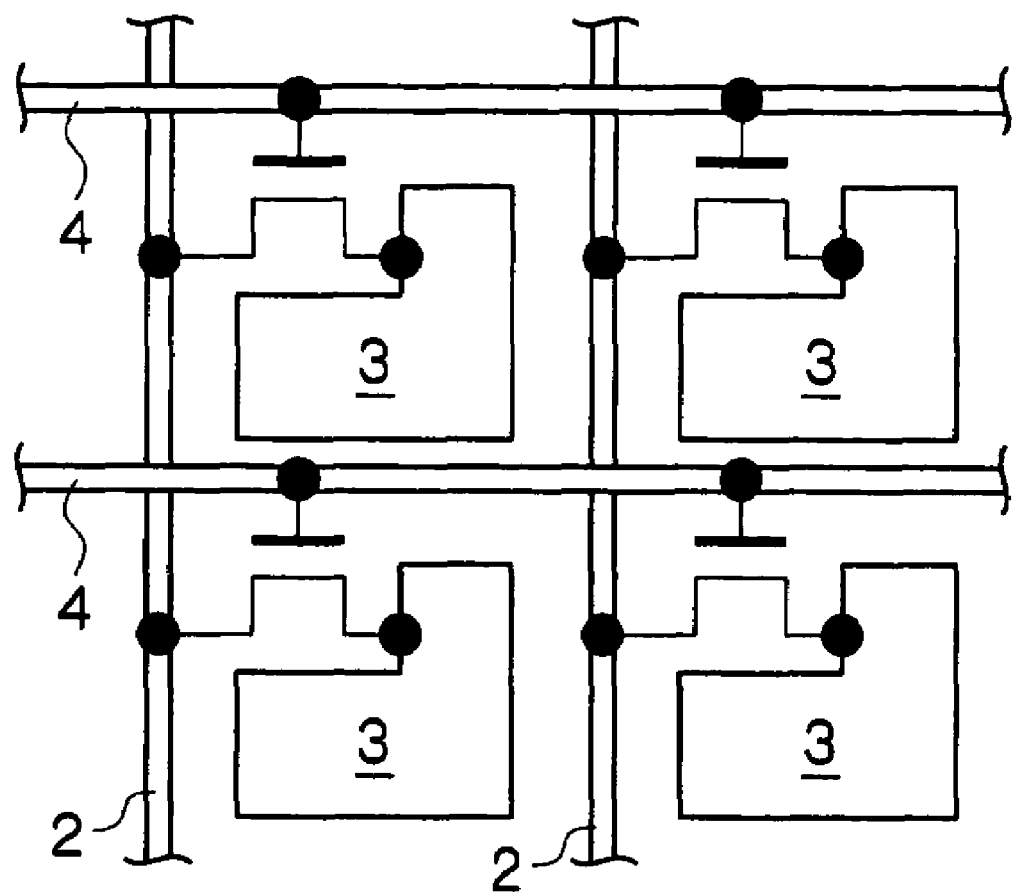
FIG. 4 is an explanatory diagram showing another example of the principle by which the image display medium pertaining to the first exemplary embodiment displays an image.

As shown in FIG. 1A, FIG. 1B and FIG. 2, the image display medium 100 includes: an upper substrate 12 formed from a transparent, flexible film; a lower substrate 14 that is similarly formed from a transparent, flexible film and is disposed parallel to the upper substrate 12; an anisotropic conductive material 16 that has conductivity in a thickness direction and is interposed between the upper substrate 12 and the lower substrate 14; and a liquid crystal layer 18 that is configured by dispersing, inside gaps in a polymer, cholesteric liquid crystal interposed between the upper substrate 12 and the lower substrate 14. The upper substrate 12 and the lower substrate 14 correspond to substrates of the present invention, and the liquid crystal layer 18 corresponds to a display layer. The display layer may be a material or have a structure whose display state changes by electrical action, such as cholesteric liquid crystal, electrochromic material, electrophoresis, and charged particle (toner or electric powder and granular material) movement. A display layer used as electronic paper that carries an image that a display layer displays after electrical action has been eliminated is preferable. The column electrodes 2 are formed on the inside surface of the upper substrate 12—that is, the surface on the side that contacts the liquid crystal layer 18—and the row electrodes 4 are formed on the inside surface of the lower substrate 14—that is, the surface on the side that contacts the liquid crystal layer 18. Both the column electrodes 2 and the row electrodes 4 are formed by a transparent, conductive material such as indium tin oxide (ITO). When voltage is applied to the column electrodes 2 and the row electrodes 4, as shown in FIG. 3, the orientation of the liquid crystal at the portion in the liquid crystal layer 18 where the column electrodes 2 and the row electrodes 4 to which the voltage has been applied intersect changes, the light transmittance or reflectivity changes, and an image is displayed. Further, as shown in FIG. 4, field-effect transistors 3 may be formed in sections sectioned by the column electrodes 2 and the row electrodes 4, and voltage may be applied to the column electrodes 2 and the row electrodes 4 so that the field-effect transistors 3 are switched ON or OFF to cause the arrangement of the liquid crystal to change.

Contact holes 20 are disposed in correspondence to the row electrodes 4 in a region of the lower substrate 14 outside of the display region 10. The row electrodes 4 are connected to the contact holes 20 via the anisotropic conductive material 16.

Connection wires 22 that connect the row electrodes 4 to a group of electrical contacts 9A formed on the second connection terminal 9 are formed on the back side of the lower substrate 14—that is, the opposite side of the side where the row electrodes 4 are formed. Similar to the connection wires 22, the second connection terminal 9 is also disposed on the back side of the lower substrate 14. The second connection terminal 9 corresponds to a second electrical contact group of the present invention. The connection wires 22 are connected to their corresponding contact holes 20, whereby the row electrodes 4 are connected to the electrical contacts 9A. Consequently, the group of connection wires 22 and the contact holes 20 form a second connection wire group of the present invention.

The first connection terminal 8 corresponds to a first electrical contact group of the present invention, is disposed on the opposite side of the second connection terminal 9 with the lower substrate 14 interposed therebetween, and a group of electrical contacts 8A are formed on the first connection terminal 8. The column electrodes 2 are connected to the electrical contacts 8A. Consequently, the portions of the column electrodes 2 outside of the display region 10 form a first connection wire group of the present invention.

The first connection terminal 8 and the second connection terminal 9 can be formed in lengths that are the same as the row-direction dimension of the display region 10. For example, when the display region 10 has the size of A4-size paper, then both the first connection terminal 8 and the second connection terminal 9 can be formed in lengths of 210 mm, which is equivalent to the row-direction dimension of A4-size paper. Additionally, for example, 1,100 of the electrical contacts 8A can be formed on the first connection terminal 8 and 1,550 of the electrical contacts 9A can be formed on the second connection terminal 9. Here, as mentioned previously, because the lengths of both the first connection terminal 8 and the second connection terminal 9 are 210 mm, the pitch of the electrical contacts 8A becomes 210 (mm)÷(1100+1)=191 μm (=133 dpi), and the pitch of the electrical contacts 9A becomes 210 (mm)÷(1550+1) =135.5 μm (=187.5 dpi). Here, because the distance between the first electrical contact group and the second electrical contact group along the thickness direction is greater than the distance between either of the electrical contacts 8A and the electrical contacts 9A, the distance between the first connection terminal 8 on which the first electrical contact group is formed and the second connection terminal 9 on which the second electrical contact group is formed—that is, the thickness of the lower substrate 14—is greater than the distance between either of the electrical contacts 8A and the electrical contacts 9A. Consequently, the thickness of the lower substrate 14 is greater than 191 μm. The thickness of the lower substrate 14 is preferably 400 to 760 μm—that is, 0.4 to 0.76 mm.

As shown in FIG. 5, by clipping, in a clip portion 200 that is an electrical connection connector of the present invention and is connected to an image writing device (not shown), the portion of the image display medium 100 of the first exemplary embodiment where the first connection terminal 8 and the second connection terminal 9 are formed, the image writing device is connected to the image display medium 100.

A terminal that electrically contacts the electrical contacts 8A of the first connection terminal 8 is formed on one of inside surfaces of the clip portion 200, and a terminal that electrically contacts the electrical contacts 9A of the second connection terminal 9 is formed on the other of the surfaces. When the image display medium 100 is to be clipped by the clip portion 200, anisotropic conductive sheets 150 that are sheets of an anisotropic conductive material that conducts electricity only in the thickness direction are respectively inserted between the first connection terminal 8 and the clip portion 200 and between the second connection terminal 9 and the clip portion 200. Alternatively, the anisotropic conductive sheets 150 may be adhered beforehand to the surfaces of the clip portion 200 on which first and second connection terminals are formed.

When an image is to be written, the clip portion 200 is connected to the image display medium 100 pertaining to the first exemplary embodiment as shown in FIG. 5, and a image selection signal is inputted from a image selection drive circuit of the image writing device. Thus, voltage is applied to the column electrodes 2 and the row electrodes 4, and an image is formed in the display region 10. The liquid crystal layer 18 is configured by cholesteric liquid crystal having orientation memorability, so that when an image is formed, the formed image is carried on the display region 10 for a long period of time even after the clip portion 200 has been removed.

Because a circuit, such as a drive IC or a booster circuit, for driving the column electrodes 2 and the row electrodes 4 is not disposed on the image display medium 100, the image display medium 100 can be formed lightweight and thin. Moreover, because the image display medium 100 can be carried around in a state where the clip portion 200 has been removed, the image display medium 100 has excellent portability and flexibility. Moreover, because the first connection terminal 8 and the second connection terminal 9 are separated by the lower substrate 14, they are physically separated from each other a distance greater than the distance between the electrical contacts 8A of the first connection terminal 8 and the electrical contacts 9A of the second connection terminal 9.

Second Exemplary Embodiment

Figure 6A:
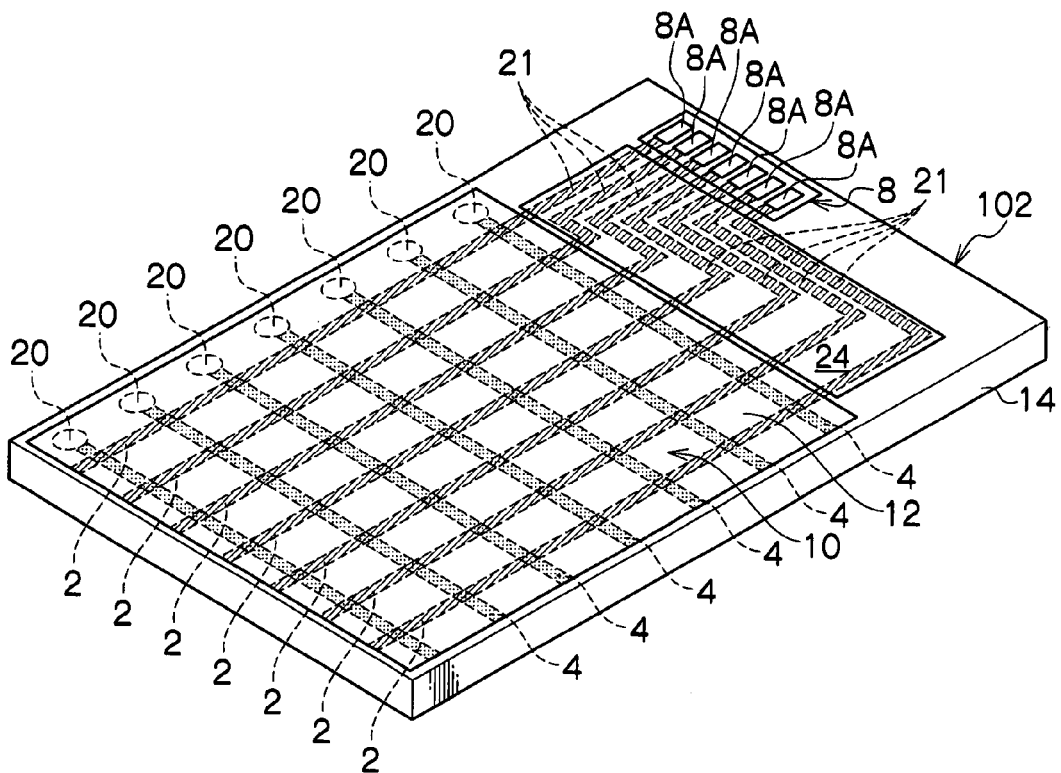
FIG. 6A is a perspective diagram showing the configuration of an image display medium pertaining to a second exemplary embodiment seen from a front side.
Figure 6B:
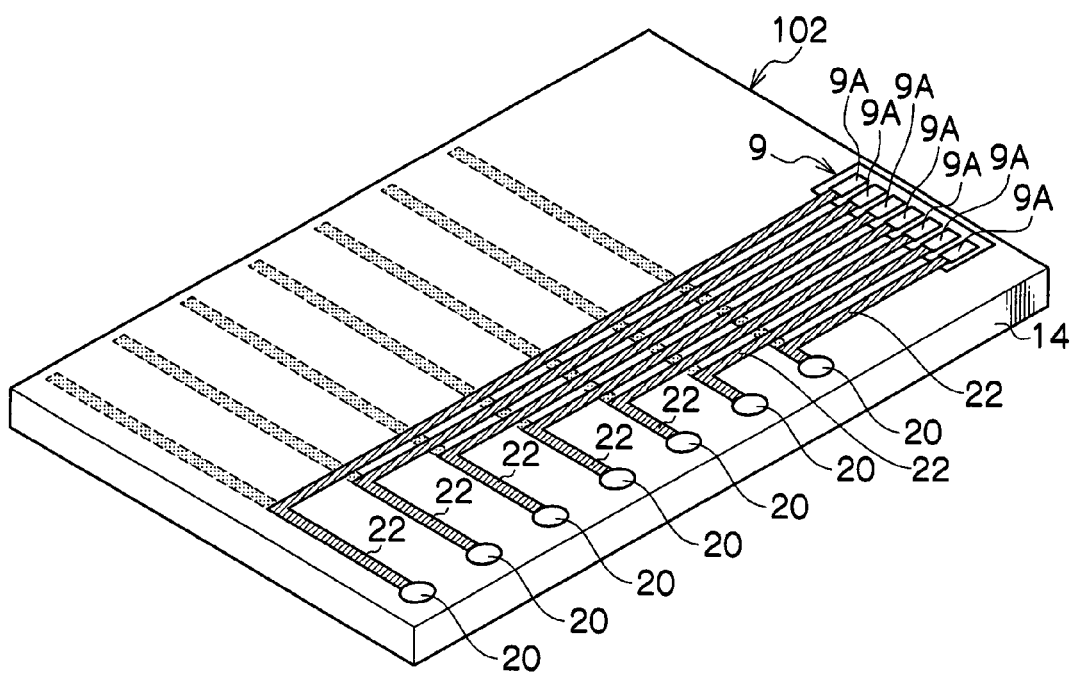
FIG. 6B is a perspective diagram showing the configuration of the image display medium pertaining to the second exemplary embodiment seen from a back side.

As shown in FIG. 6A and FIG. 6B, in an image display medium 102 pertaining to a second exemplary embodiment, the first connection terminal 8 is formed on the front side and the second connection terminal 9 is formed on the back side, but both are formed in lengths smaller than the width-direction dimension of the display region 10. For example, when the display region 10 has the size of A4-size paper, then the first connection terminal 8 and the second connection terminal 9 can be formed in lengths (e.g., 50 mm) smaller than 210 mm, which is the width-direction dimension of the display region 10. Consequently, similar to the image display medium 100 of the first exemplary embodiment, assuming that there are 1,100 of the column electrodes 2 and 1,550 of the row electrodes 4, then the pitch of the column electrodes 2 becomes 210 (mm)÷(1100+1)=191 µm (=133 dpi), but the pitch of the electrical contacts 8A of the first connection terminal 8 becomes 50 (mm)÷(1100+1)=45.5 µm, so the pitch of the electrical contacts 8A becomes much smaller than the pitch of the column electrodes 2. Thus, a wire density changing portion 24 that changes the width-direction density of the wires is formed on the portion of the surface on the front side of the lower substrate 14 of the image display medium 102 between the upper substrate 12 and the first connection terminal 8. The wire density changing portion 24 comprises a multilayer flexible substrate, for example, and connection wires 21 that connect the column electrodes 2 and the electrical contacts 8A to each other are embedded in the wire density changing portion 24. The group of connection wires 21 configures a first connection wire group of the present invention.

Similar to the image display medium 100 pertaining to the first exemplary embodiment, contact holes 20 are disposed in one side edge of the lower substrate 14, and the row electrodes 4 are connected to the contact holes 20 at one end. Additionally, a group of connection wires 22 that connects the contact holes 20 and the electrical contacts 9A of the second connection group 9 to each other is formed on the surface of the back side of the lower substrate 14. It will be noted that, because there are 1,500 of the electrical contacts 9A, the pitch of the electrical contacts 9A is 500 mm÷(1500+1)=32.3 µm.

As shown in FIG. 7, by clipping, in a clip portion 202, the portion where the first connection terminal 8 and the second connection terminal 9 are formed, the image display medium 102 can be connected to an image writing device (not shown). Aside from having a smaller width, the clip portion 202 has the same configuration as that of the clip portion 200 of the first exemplary embodiment.

Third Exemplary Embodiment

Figure 8A:
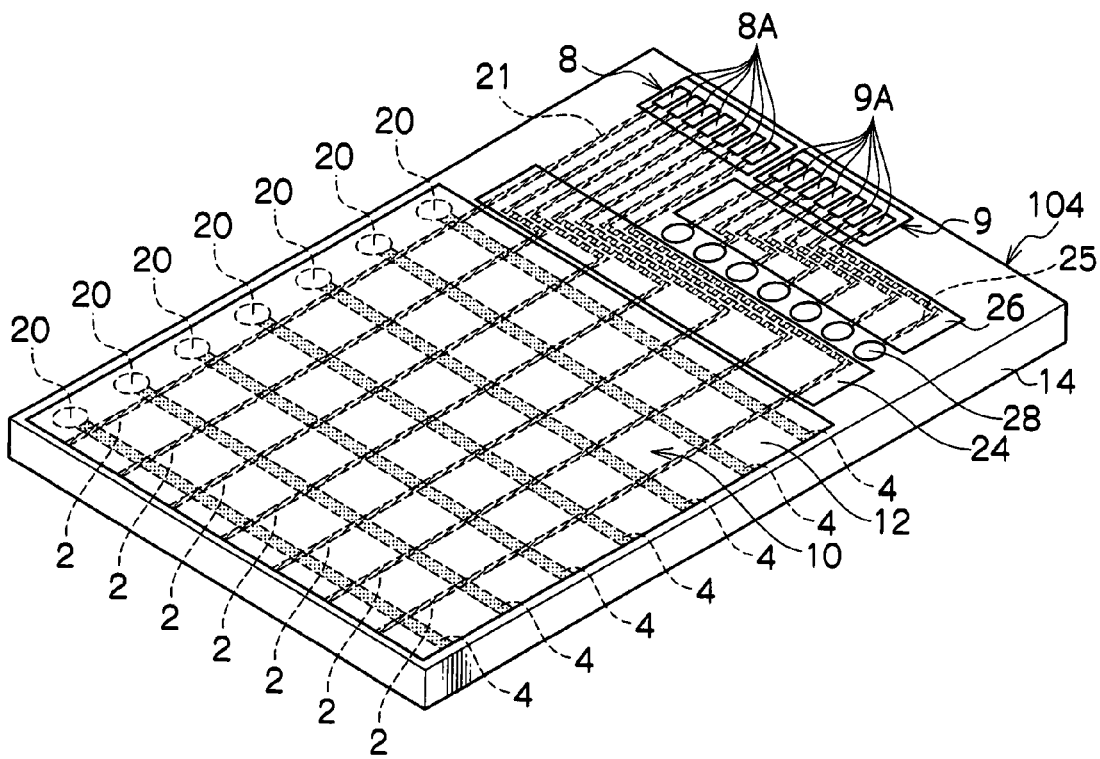
FIG. 8A is a perspective diagram showing the configuration of an image display medium pertaining to a third exemplary embodiment seen from a front side.
Figure 8B:
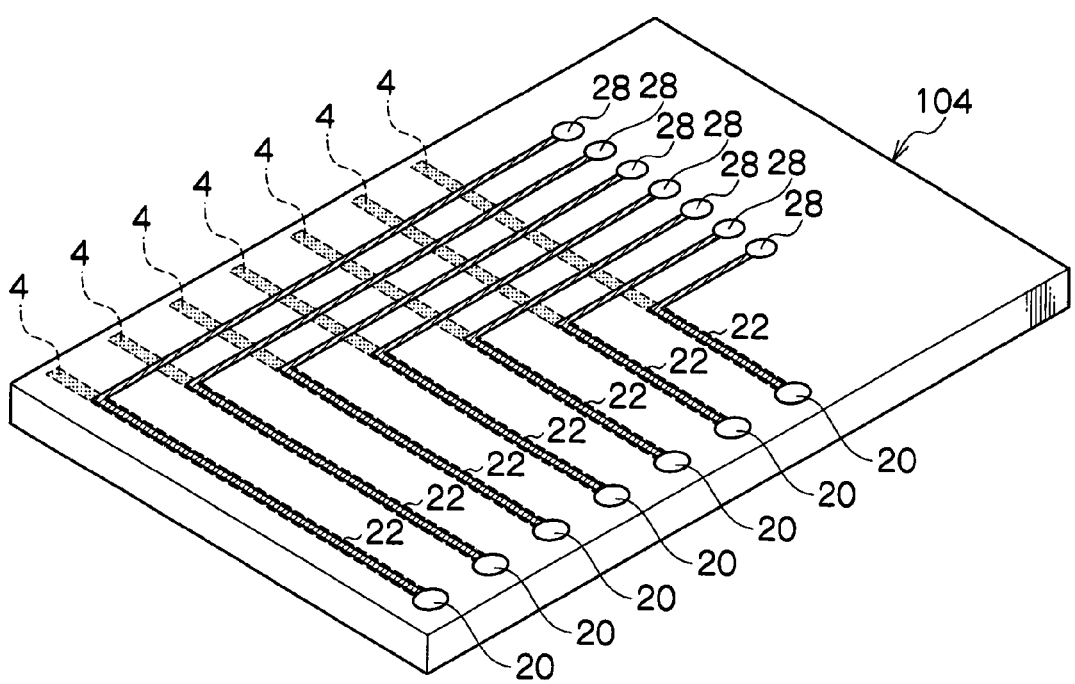
FIG. 8B is a perspective diagram showing the configuration of the image display medium pertaining to the third exemplary embodiment seen from a back side.
Figure 10:
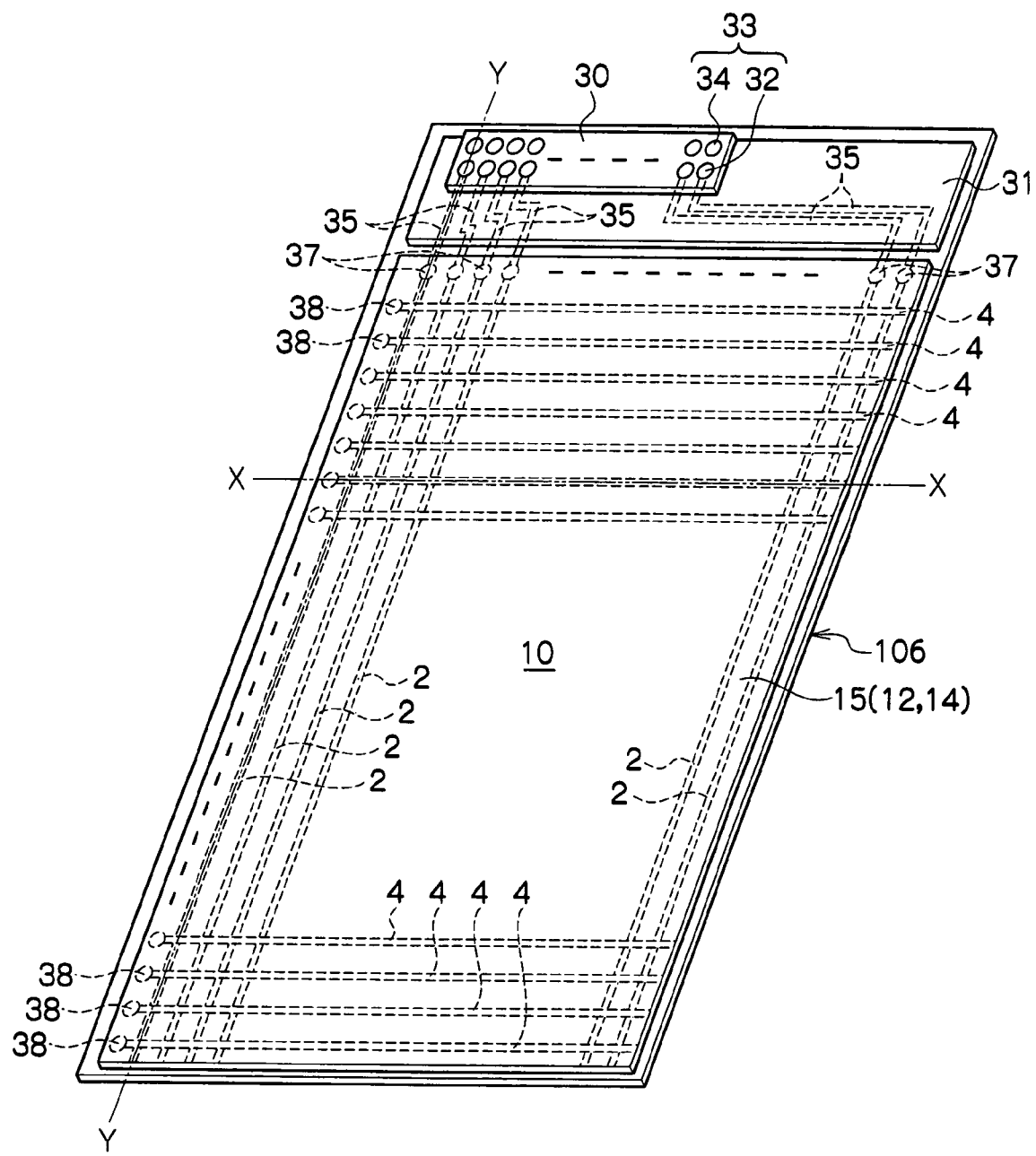
FIG. 10 is a perspective diagram showing the configuration of an image display medium pertaining to a fourth exemplary embodiment seen from a front side.
Figure 11:
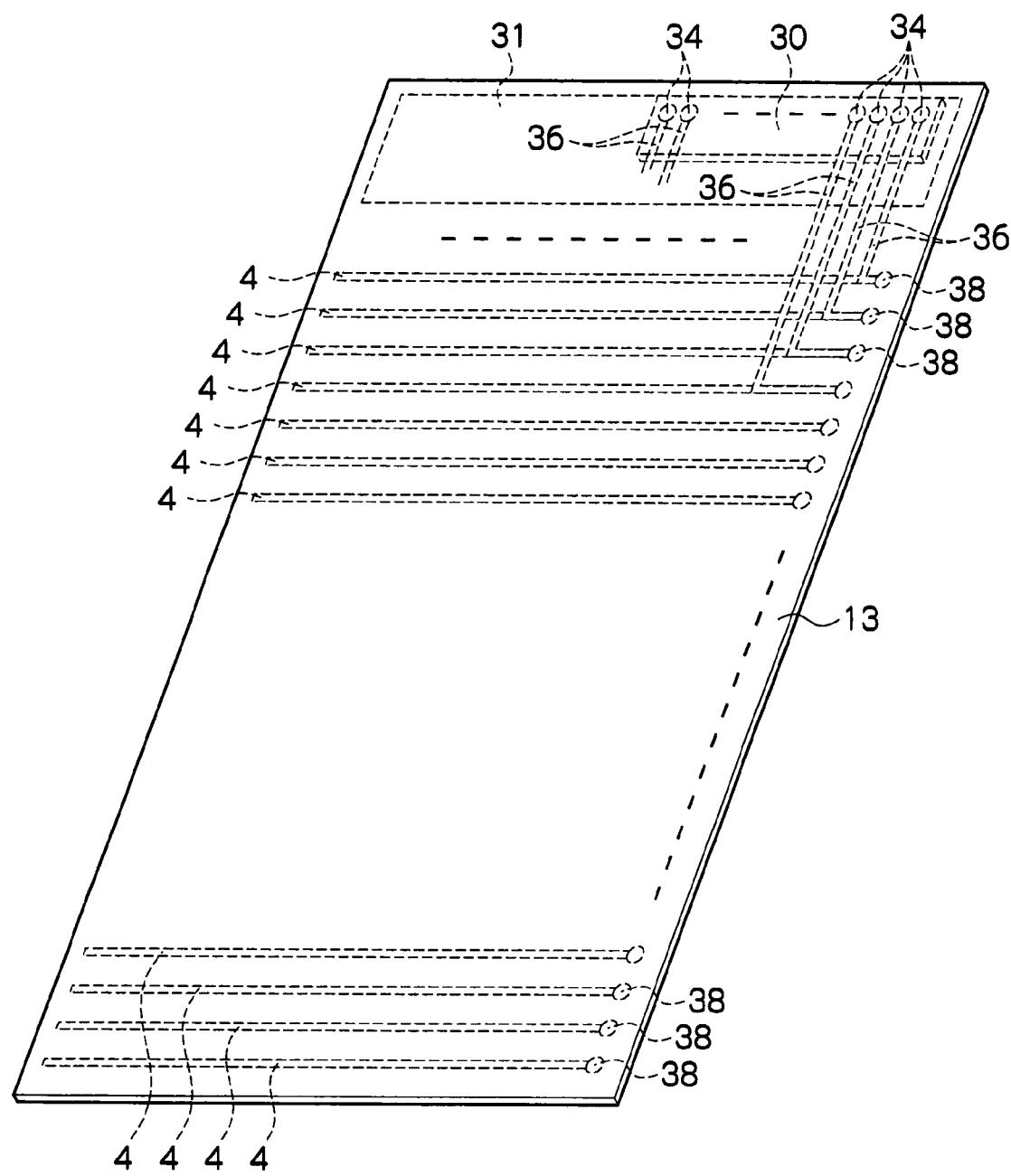
FIG. 11 is a perspective diagram showing the configuration of the image display medium pertaining to the fourth exemplary embodiment seen from a back side.
Figure 12:
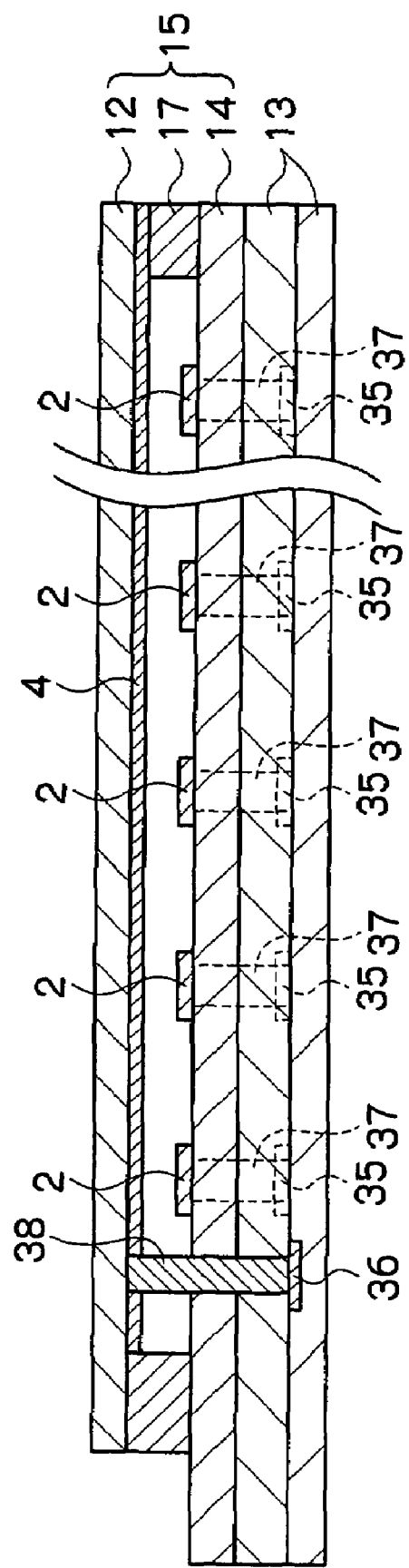
FIG. 12 is a cross-sectional diagram showing a row-direction cross section of the image display medium pertaining to the fourth exemplary embodiment.
Figure 13:
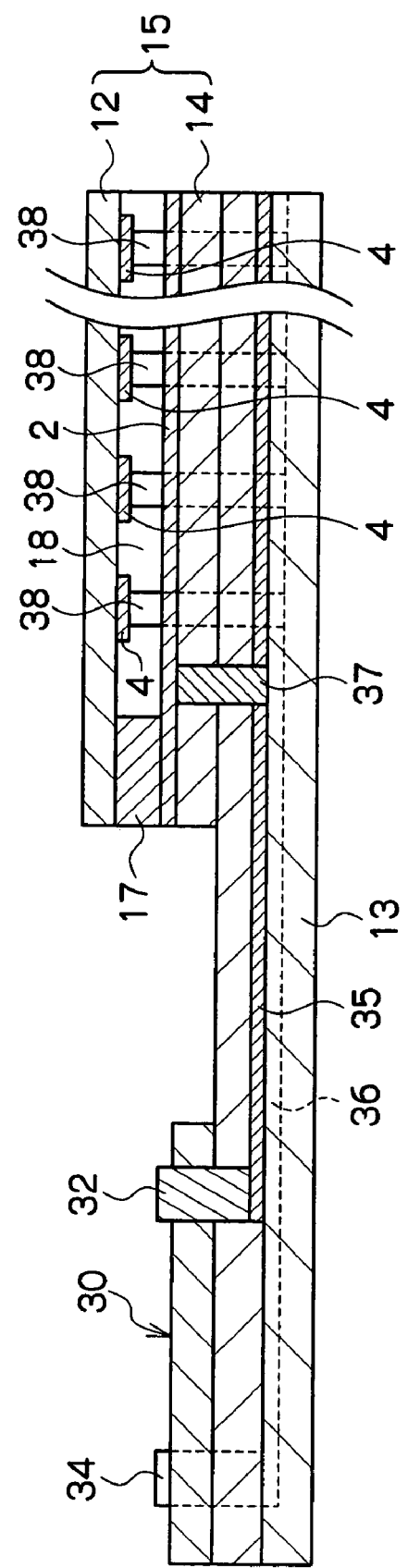
FIG. 13 is a cross-sectional diagram showing a column-direction cross section of the image display medium pertaining to the fourth exemplary embodiment.

As shown in FIG. 8A, in an image display medium 104 pertaining to a third exemplary embodiment, not only the first connection terminal 8 but also the second connection terminal 9 are formed on the surface of the front side, and a wire density changing portion 26 is formed between the wire density changing portion 24 and the second connection terminal 9. Contact holes 28 to which the connection wires 22 are connected are formed between the wire density changing portion 24 and the wire density changing portion 26. The contact holes 28 and the electrical contacts 9A of the second connection terminal 9 are connected to each other by connection wires 25 embedded inside the wire density changing portion 26. Consequently, the row electrodes 4 are connected to the electrical contacts 9A by the contact holes 20, the connection wires 22, the contact holes 28, and the connection wires 25. Consequently, the contact holes 20, the connection wires 22, the contact holes 28, and the connection wires 25 configure a second connection wire group of the present invention.

The first connection terminal 8 and the second connection terminal 9 are disposed further apart from each other than 45.5 µm, which is the pitch of the electrical contacts 8A whose pitch is greater than that of the electrical contacts 9A.

Excluding these points, the image display medium 104 has the same configuration as that of the image display medium 102 pertaining to the second exemplary embodiment, including the shapes and pitches of the electrical contacts 8A and the electrical contacts 9A.

As shown in FIG. 9, by clipping, in a clip portion 204, the portion where the first connection terminal 8 and the second connection terminal 9 are formed, the image display medium 104 can be connected to an image writing device (not shown). In the clip portion 204, a terminal group (not shown) that contacts the electrical contacts 8A of the first connection terminal 8 and a terminal group (not shown) that contacts the electrical contacts 9A of the second connection terminal 9 are disposed adjacent to each other.

In the image display medium 104 pertaining to the third exemplary embodiment, the first connection terminal 8 and the second connection terminal 9 are disposed apart from each other a distance greater than the pitch of either of the electrical contacts 8A and the electrical contacts 9A along the surface direction.

Fourth Exemplary Embodiment

An image display medium 106 pertaining to a fourth exemplary embodiment is an example where electrical contact groups to which the column electrodes 2 and the row electrodes 4 are connected are formed instead of the first connection terminal 8 and the second connection terminal 9. As shown in FIG. 10 to FIG. 13, the image display medium 106 has a structure where a display substrate 15 comprising an upper substrate 12, a lower substrate 14, and a spacer 17 disposed in the outer peripheral portion of the upper substrate 12 and the lower substrate 14 is disposed on a large substrate 13. The inside of a space formed by the upper substrate 12, the lower substrate 14 and the spacer 17 is filled with liquid crystal to form the liquid crystal layer 18. The display region 10 is formed inside the spacer 17 of the display substrate 15.

A wire density changing portion 31 is formed on the large substrate 13 outside of the display substrate 15, and a connection terminal 30 on which an electrical contact group 33 is formed is formed on the wire density changing portion 31. Electrical contacts 32 connected to the column electrodes 2 are disposed at predetermined intervals in a single row in the direction of X in FIG. 10—that is, along the width direction of the large substrate 13—and electrical contacts 34 connected to the row electrodes 4 are disposed at predetermined intervals parallel to the row of electrical contacts 32. The electrical contacts 32 and the electrical contacts 34 are both pin-shaped. The electrical contact group 33 is configured by the electrical contacts 32 and the electrical contacts 34. Further, the distance between the row of electrical contacts 32 and the row of electrical contacts 34 is greater than either of the distance between two adjacent electrical contacts 32 and the distance between two adjacent electrical contacts 34.

Connection wires 35 that connect the column electrodes 2 to the electrical contacts 32 and connection wires 36 that connect the row electrodes 4 to the electrical contacts 34 are formed inside the large substrate 13. The column electrodes 2 are connected to the connection wires 35 via conductive pins 37, and the row electrodes 4 are connected to the connection wires 36 via conductive pins 38. Consequently, the column electrodes 2 are connected to the electrical contacts 32 via the conductive pins 37 and the connection wires 35, and the row electrodes 4 are connected to the electrical contacts 34 via the conductive pins 38 and the connection wires 36.

Figure 14A:
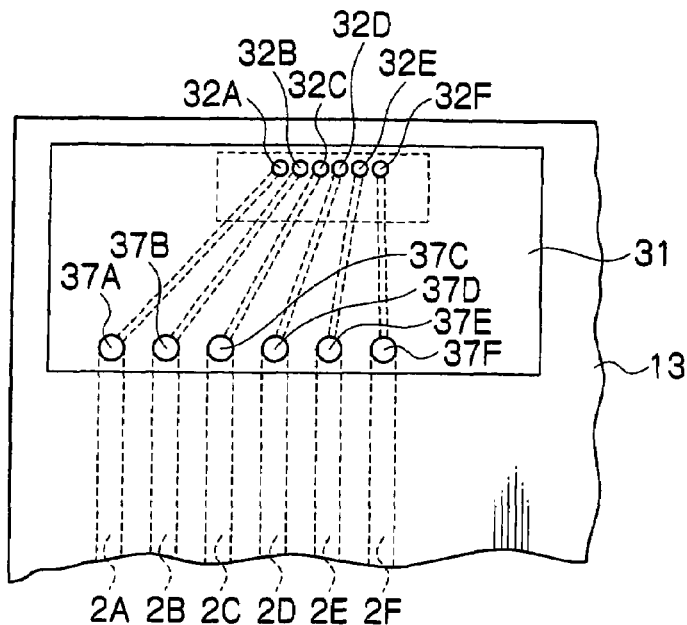
FIG. 14A is a plan diagram showing another example of a wire density changing portion with which the image display medium pertaining to the fourth exemplary embodiment is disposed.
Figure 14B:
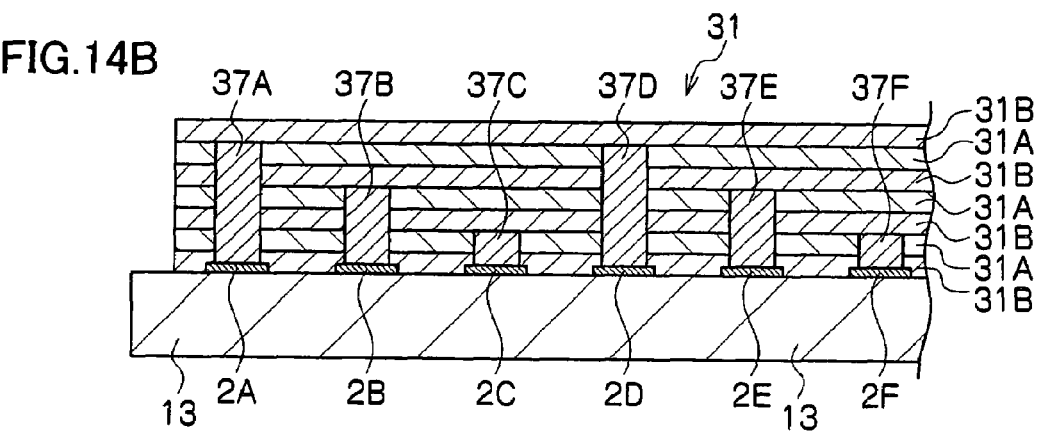
FIG. 14B is a cross-sectional diagram showing another example of the wire density changing portion with which the image display medium pertaining to the fourth exemplary embodiment is disposed.
Figure 14C:
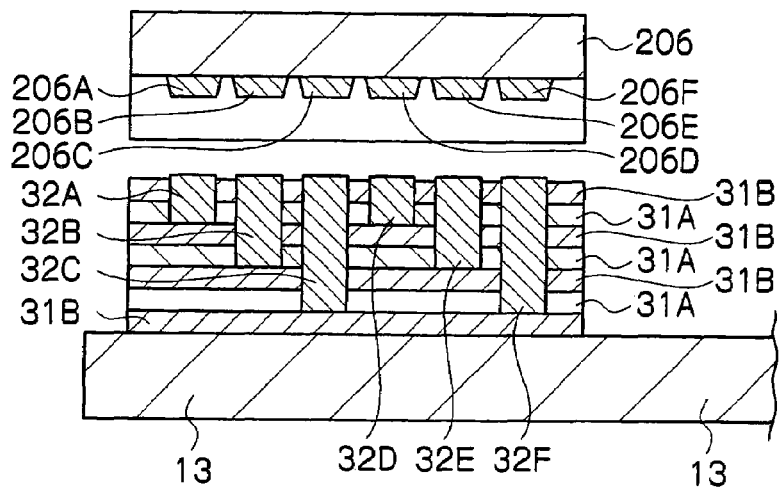
FIG. 14C is a cross-sectional diagram showing another example of the wire density changing portion with which the image display medium pertaining to the fourth exemplary embodiment is disposed.
Figure 15:
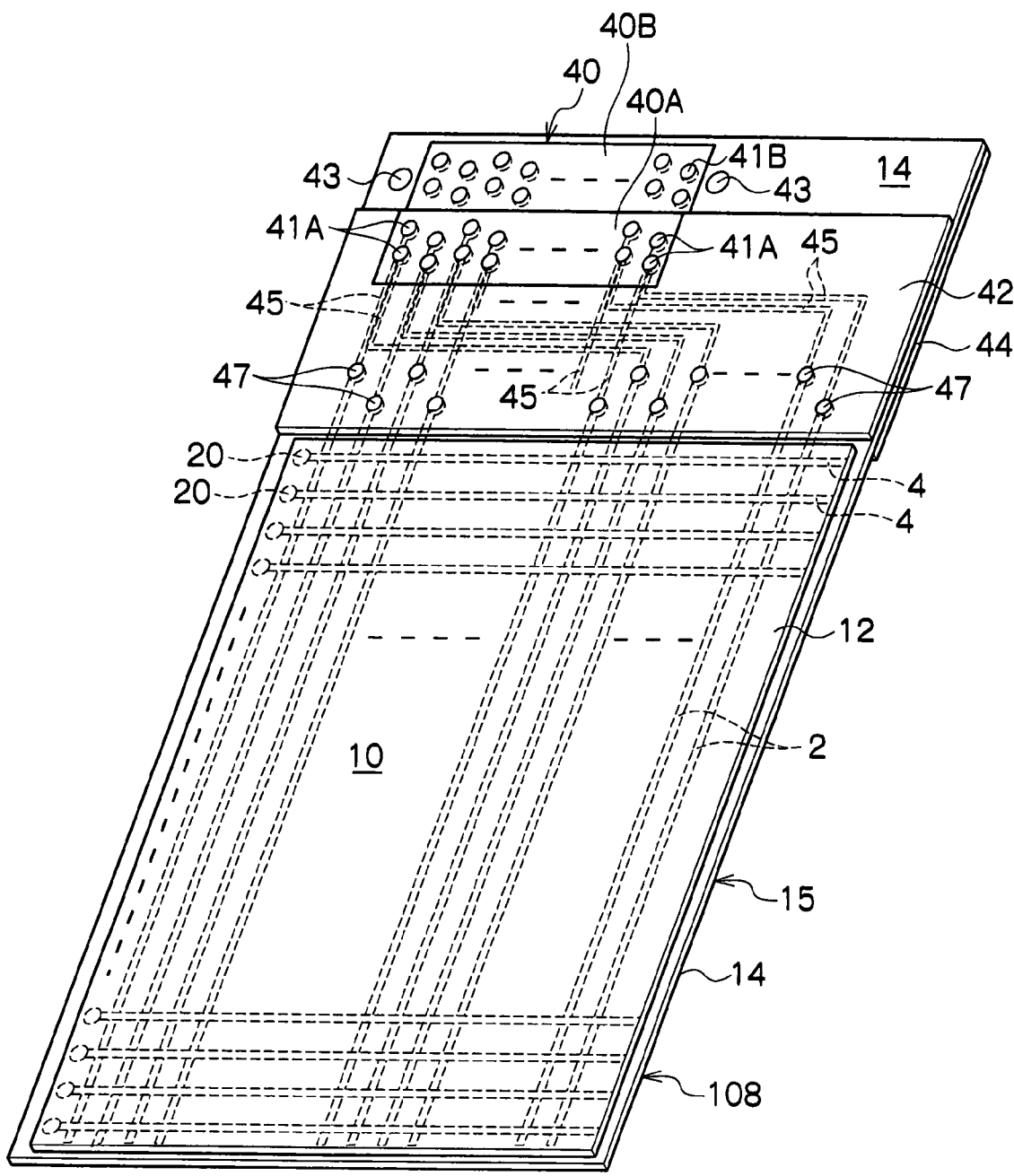
FIG. 15 is a perspective diagram showing the configuration of an image display medium pertaining to a fifth exemplary embodiment seen from a front side.
Figure 16:
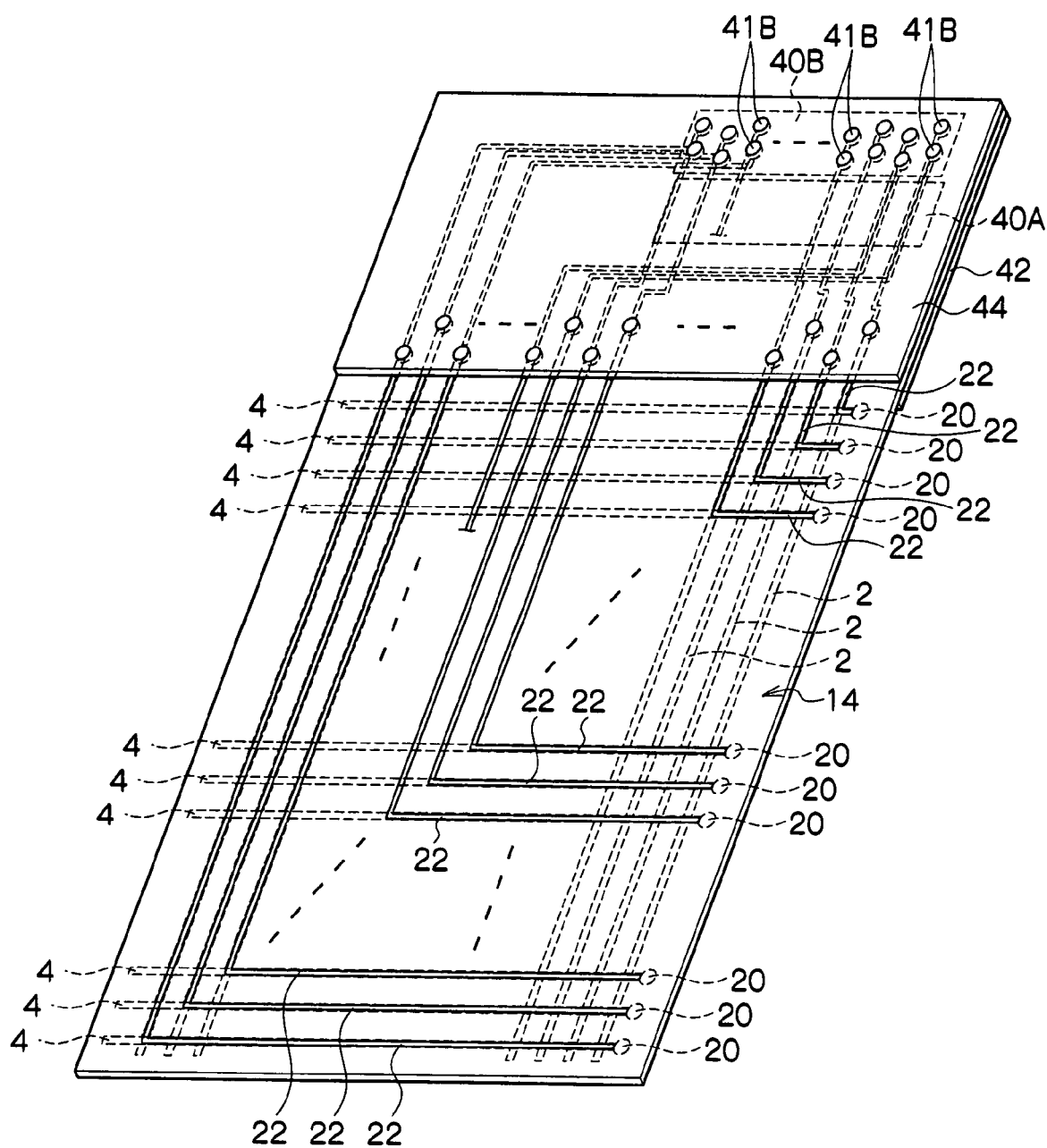
FIG. 16 is a perspective diagram showing the configuration of the image display medium pertaining to the fifth exemplary embodiment seen from a back side.
Figure 17:
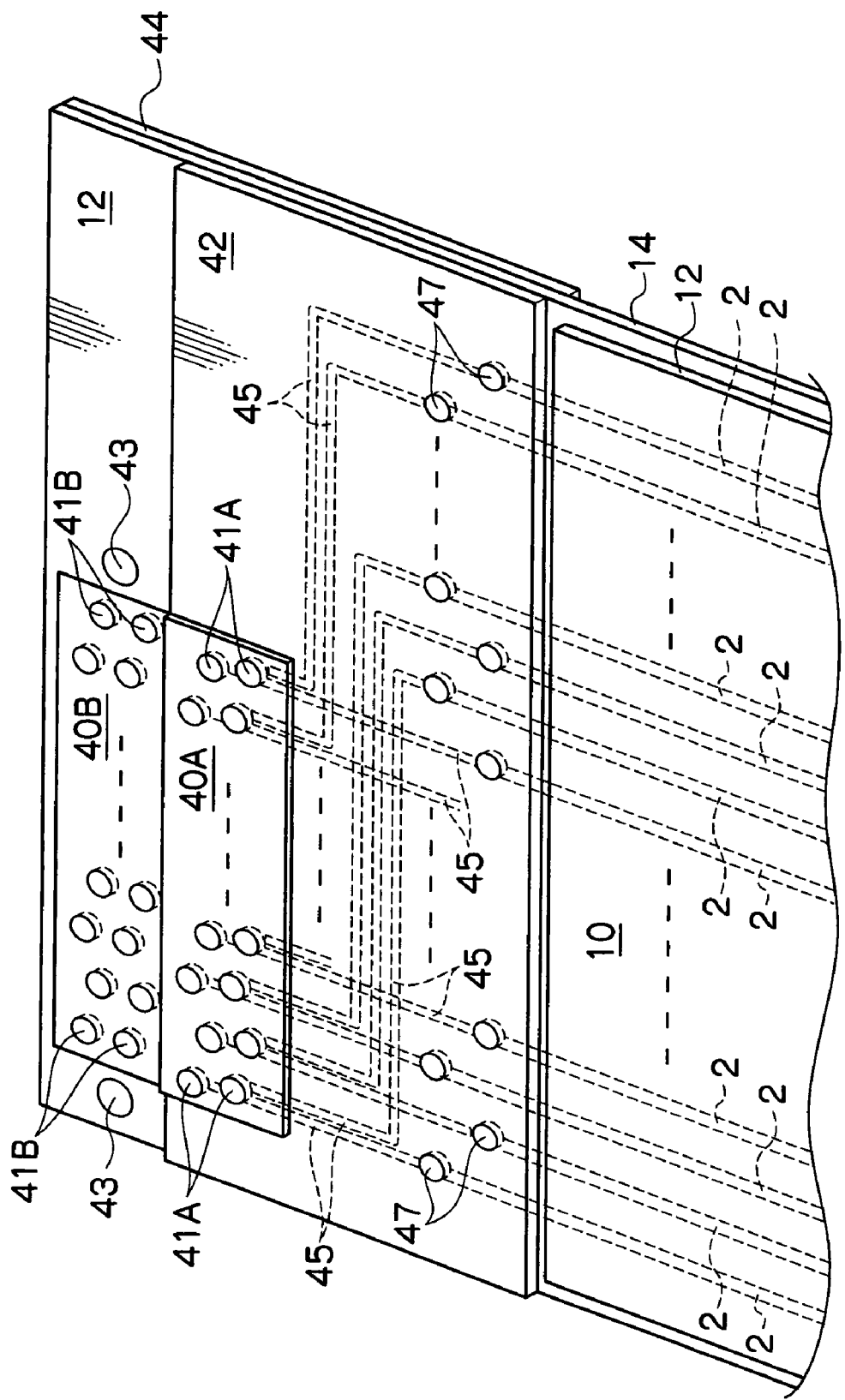
FIG. 17 is an enlarged diagram showing the configuration of the vicinity of a multilayer wiring substrate on the front side of the image display medium pertaining to the fifth exemplary embodiment.

In the wire density changing portion 31, as shown in FIG. 10 to FIG. 13, a connection wire 35 may be disposed for each of the column electrodes 2, but as shown in FIG. 14A to FIG. 14C, insulating layers 31B and conductive layers 31A may be laminated and formed. Here, as shown in FIG. 14A, the column electrodes 2 will be called, in order from the left side, the column electrode 2A, the column electrode 2B, the column electrode 2C, the column electrode 2D, the column electrode 2E, and the column electrode 2F, and the conductive pins 37 connected to the column electrode 2A, the column electrode 2B, the column electrode 2C, the column electrode 2D, the column electrode 2E, and the column electrode 2F will be called the conductive pin 37A, the conductive pin 37B, the conductive pin 37C, the conductive pin 37D, the conductive pin 37E, and the conductive pin 37F. Additionally, the electrical contacts 32 will be called, in order from the left side, the electrical contact 32A, the electrical contact 32B, the electrical contact 32C, the electrical contact 32D, the electrical contact 32E, and the electrical contact 32F. Additionally, when a connector 206 that inputs a signal from an image writing device (not shown) is connected to the connection terminal 30, then a contact terminal 206A, a contact terminal 206B, a contact terminal 206C, a contact terminal 206D, a contact terminal 206E, and a contact terminal 206F of the connector 206 respectively contact the electrical contact 32A, the electrical contact 32B, the electrical contact 32C, the electrical contact 32D, the electrical contact 32E, and the electrical contact 32F, as shown in FIG. 14C.

As shown in FIG. 14B, the insulating layers 31B and the conductive layers 31A are alternately laminated on the large substrate 13 such that there are a total of seven layers comprising three of the conductive layers 31A and four of the insulating layers 31B. The conductive pin 37A and the conductive pin 37D are the longest, penetrate five of the insulating layers 31B and the conductive layers 31A from below, and reach the uppermost conductive layer 31A. The conductive pin 37B and the conductive pin 37E are the next longest, penetrate three of the insulating layers 31B and the conductive layers 31A from below, and reach the second conductive layer 31A from the top. The conductive pin 37C and the conductive pin 37F are the shortest, penetrate the lowermost insulating layer 31B, and reach the lowermost conductive layer 31A. On the other hand, as shown in FIG. 14C, the electrical contact 32A and the electrical contact 32D are the shortest, the electrical contact 32B and the electrical contact 32E are the next shortest, and the electrical contact 32C and the electrical contact 32F are the longest. The electrical contact 32A and the electrical contact 32D penetrate one of the insulating layers 31B from above and reach the uppermost conductive layer 31A. The electrical contact 32B and the electrical contact 32E penetrate three of the insulating layers 31B and the conductive layers 31A from above and reach the second conductive layer 31A from the top. The electrical contact 32C and the electrical contact 32F penetrate five of the insulating layers 31B and the conductive layers 31A from above and reach the third conductive layer 31A from the top. Consequently, the conductive pin 37A and the electrical contact 32A, and the conductive pin 37D and the electrical contact 32D, are electrically connected by the uppermost conductive layer 31A. Further, the conductive pin 37B and the electrical contact 32B, and the conductive pin 37E and the electrical contact 32E, are electrically connected by the second conductive layer 31A from the top. And the conductive pin 37C and the electrical contact 32C, and the conductive pin 37F and the electrical contact 37F, are electrically connected by the third conductive layer 31A from the top.

Thus, the column electrodes 2A to 2F are electrically connected respectively to the electrical contacts 32A to 32F.

In the image display medium 106, as mentioned previously, the distance between the row of electrical contacts 32 and the row of electrical contacts 34 is greater than either of the distance between two adjacent electrical contacts 32 and the distance between two adjacent electrical contacts 34.

Fifth Exemplary Embodiment

As shown in FIG. 15 to FIG. 18, an image display medium 108 pertaining to a fifth exemplary embodiment includes: a display substrate 15 configured by a lower substrate 14, an upper substrate 12, and a spacer 17; a multilayer wiring substrate 42 disposed on the surface of the front side of the upper substrate 12 outside of the display region 10; a multilayer wiring substrate 44 disposed on the surface of the back side of the upper substrate 12 outside of the display substrate 15; and a connection terminal 40 disposed on the opposite side of the display region 10 with the multilayer wiring substrate 42 on the surface of the front side of the upper substrate 12 interposed therebetween. Guide holes 43 into which guide pins 302 of a later-described connector 300 are inserted are opened on both sides of the connection terminal 40.

The connection terminal 40 is divided into a column connection terminal 40A, in which pin-shaped electrical contacts 41A electrically connected to the column electrodes 2 are implanted, and a row connection terminal 40B, in which pin-shaped electrical contacts 41B electrically connected to the row electrodes 4 are implanted. Both the electrical contacts 41A and the electrical contacts 41B are disposed in a staggered manner.

The column connection terminal 40A is disposed on the multilayer wiring substrate 42, and the row connection terminal 40B is disposed on the surface of the front side of the upper substrate 12. A step is formed between the column connection terminal 40A and the row connection terminal 40B.

Figure 18:
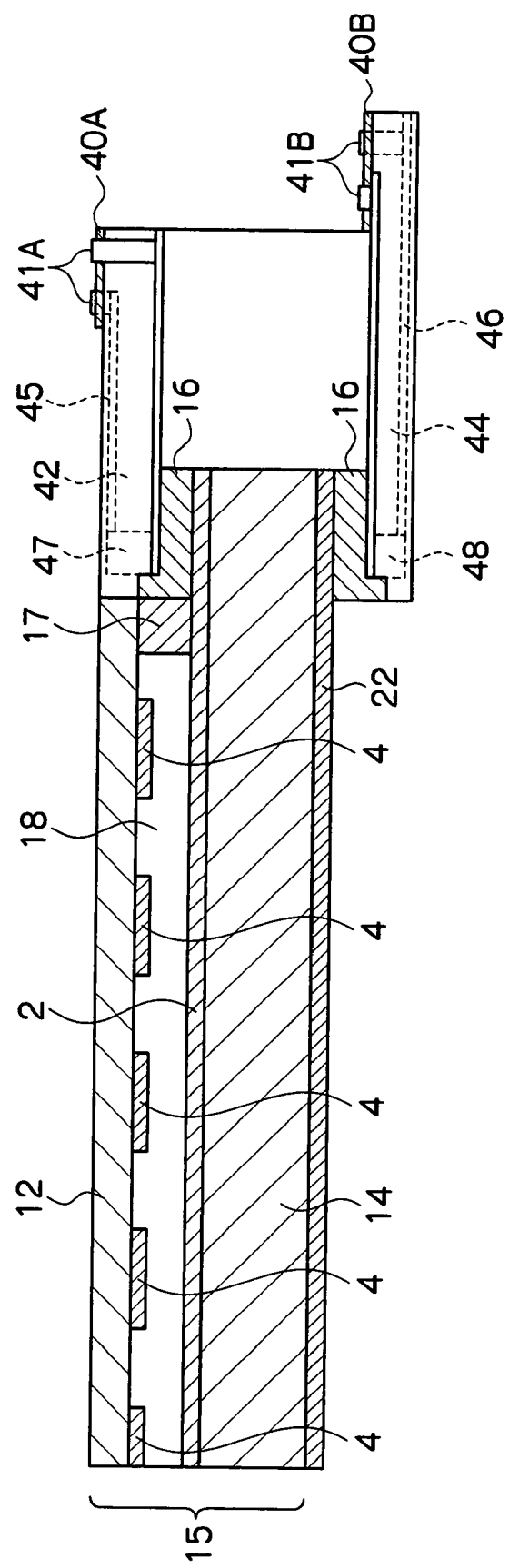
FIG. 18 is a cross-sectional diagram showing the configuration of a connection terminal of the image display medium pertaining to the fifth exemplary embodiment and its vicinity.

Wires 45 and conductive pins 47 that connect the electrical contacts 41A and the column electrodes 2 to each other are embedded inside the multilayer wiring substrate 42. Wires 46 and conductive pins 48 that connect the electrical contacts 41B and the row electrodes 4 to each other are embedded inside the multilayer wiring substrate 44. As shown in FIG. 18, the conductive pins 47, the column electrodes 2, and the conductive pins 48 are electrically connected to each other by the anisotropic conductive material 16 that has conductivity only in the thickness direction.

Figure 19:
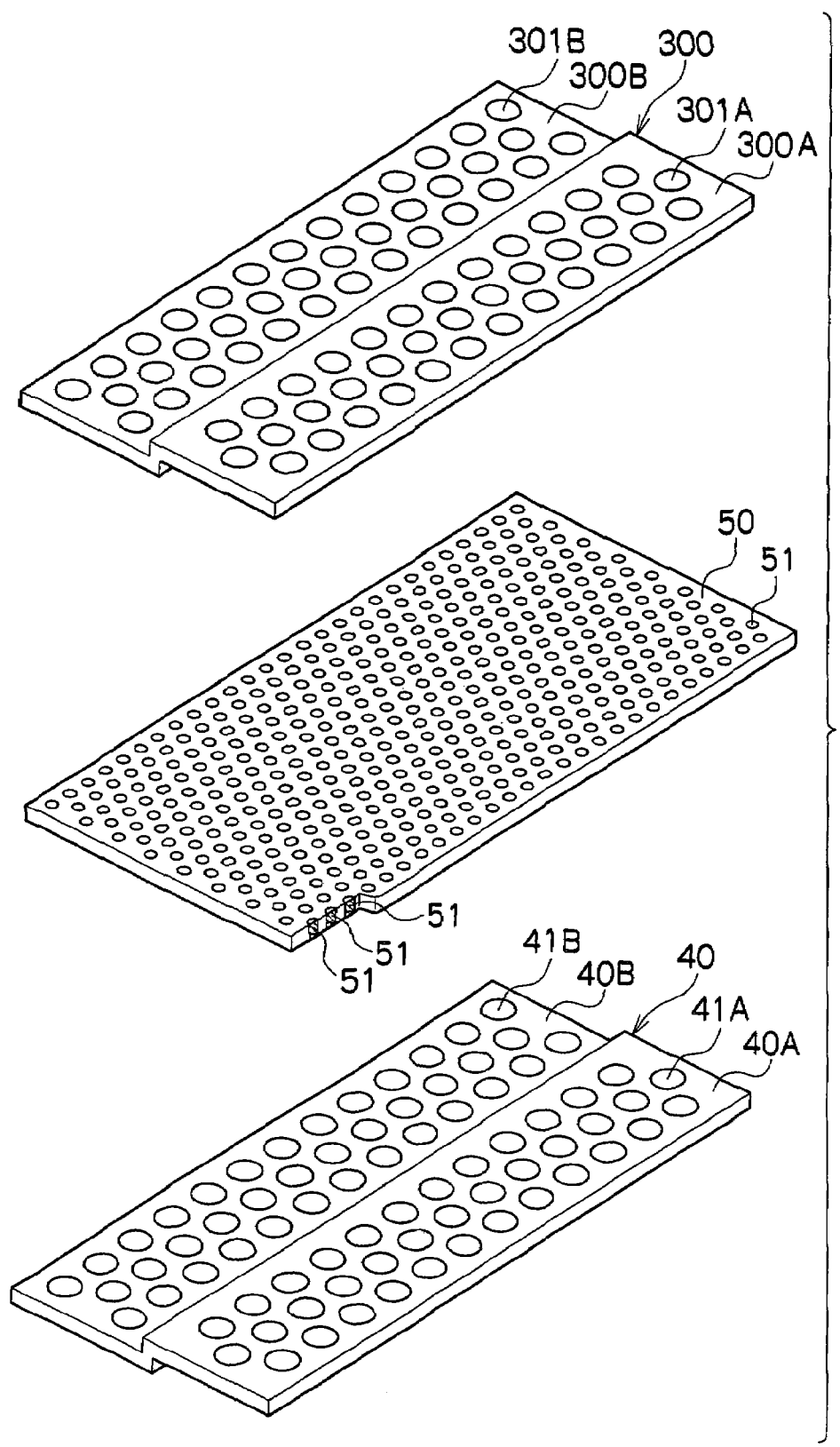
FIG. 19 is a perspective diagram showing the relative positional relationship between the connection terminal of the image display medium pertaining to the fifth exemplary embodiment, a connector that connects to the connection terminal, and an anisotropic conductive sheet inserted therebetween.

As shown in FIG. 19, the connector 300 connected to the connection terminal 40 is also divided into a column connection portion 300A at the side that connects to the column connection terminal 40A and a row connection portion 300B at the side that connects to the row connection terminal 40B. In FIG. 19, a step is formed between the column connection terminal 40A and the row connection terminal 40B, and a step is formed between the column connection portion 300A and the row connection portion 300B. As shown in FIG. 15 to FIG. 18, the row connection terminal 40B is disposed a step lower than the column connection terminal 40A, and a step corresponding to the step in the connection terminal 40 is also formed between the column connection portion 300A and the row connection portion 300B.

Spot-shaped terminals 301A that electrically contact the electrical contacts 41A disposed on the column connection terminal 40A of the connection terminal 40 are disposed on the column connection portion 300A of the connector 300, and spot-shaped terminals 301B that electrically contact the electrical contacts 41B disposed on the row connection terminal 40B of the connection terminal 40 are disposed on the row connection portion 301B. Below, sometimes the electrical contacts 41A and the electrical contacts 41B will be collectively called "the electrical contacts 41" and the terminals 301A and the terminals 301B will be collectively called "the terminals 301". The pitches of the electrical contacts 41 and the terminals 301 are the same.

Figure 20:
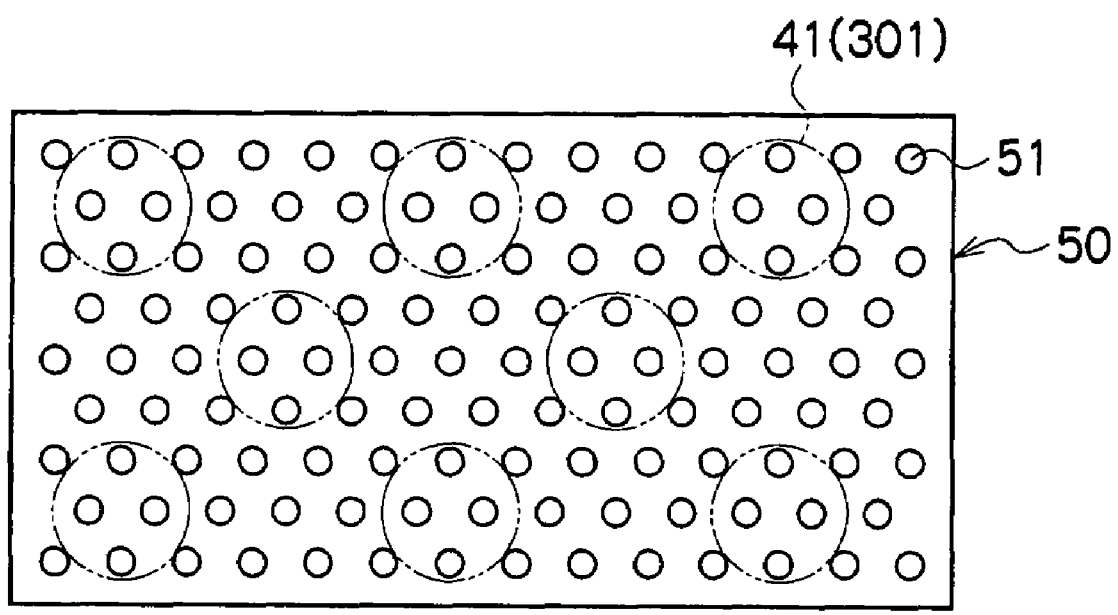
FIG. 20 is an explanatory diagram showing the relationship between pitches of contacts of the connection terminal and electrodes of the connector and conductive portions of the anisotropic conductive sheet.

An anisotropic conductive sheet 50 that is a sheet comprising an anisotropic conductive material that has conductivity only in the thickness direction is inserted between the connector 300 and the connection terminal 40. The anisotropic conductive sheet 50 has a configuration where conductive portions 51 are disposed in the thickness direction in an insulating rubber sheet. As shown in FIG. 20, the pitch of the conductive portions 51 is set such that the pitch of the electrical contacts 41 and the terminals 301 is an integral multiple of the pitch of the conductive portions 51. Specifically, the pitch of the conductive portions 51 is 2 to 4 times the pitch of the electrical contacts 41 and the terminals 301, for example. Consequently, a plurality of the conductive portions 51 contacts the electrical contacts 41 and the terminals 301, and the number of conductive portions 51 contacting any of the electrical contacts 41 and the terminals 301 is substantially constant. Consequently, even if there is a positional relationship where the attachment position of the connector 300 is slightly shifted from a predetermined position and the terminals 301 and the electrical contacts 41 and a plurality of the terminals 301 and one of the electrical contacts 41 overlap, the plurality of the terminals 301 is prevented from short-circuiting due to the one of the electrical contacts 41.

Figure 21:
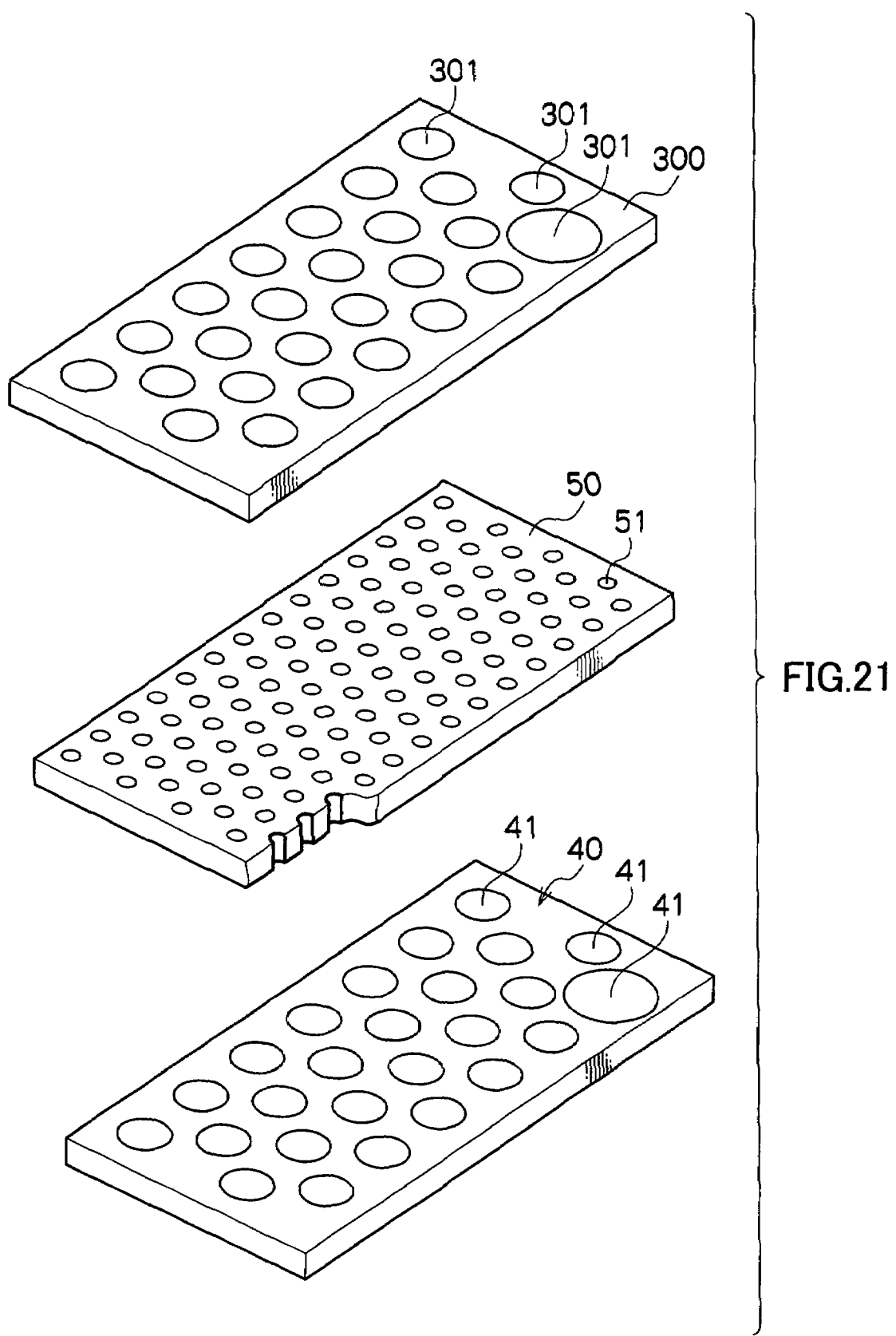
FIG. 21 is a perspective diagram showing the diametric distribution of the contacts and the electrodes when there is the potential for a large current to flow in some of the contacts of the connection terminal and the electrodes of the connector.

When there is the potential for a large current to flow to some of the electrical contacts 41 and the terminals 301, as shown in FIG. 21, it suffices for the pitch of the electrical contacts 41 and the terminals 301 to remain the same but enlarge the diameters of the electrical contact 41 and the terminal 301 where there is the potential for a large current to flow.

Figure 22A:
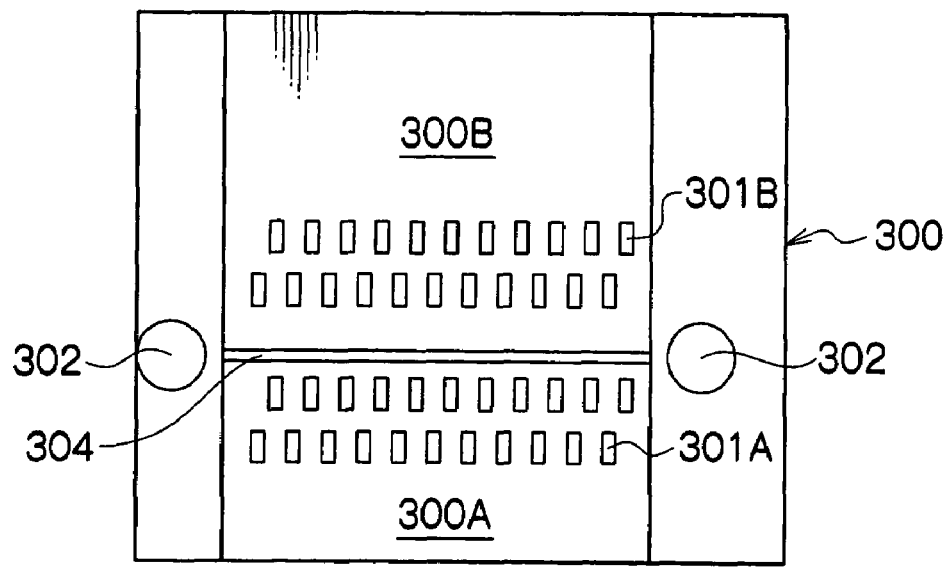
FIG. 22A is a plan diagram showing another example of the connection terminal of the image display medium pertaining to the fifth exemplary embodiment and the connector that connects to the connection terminal.
Figure 22B:
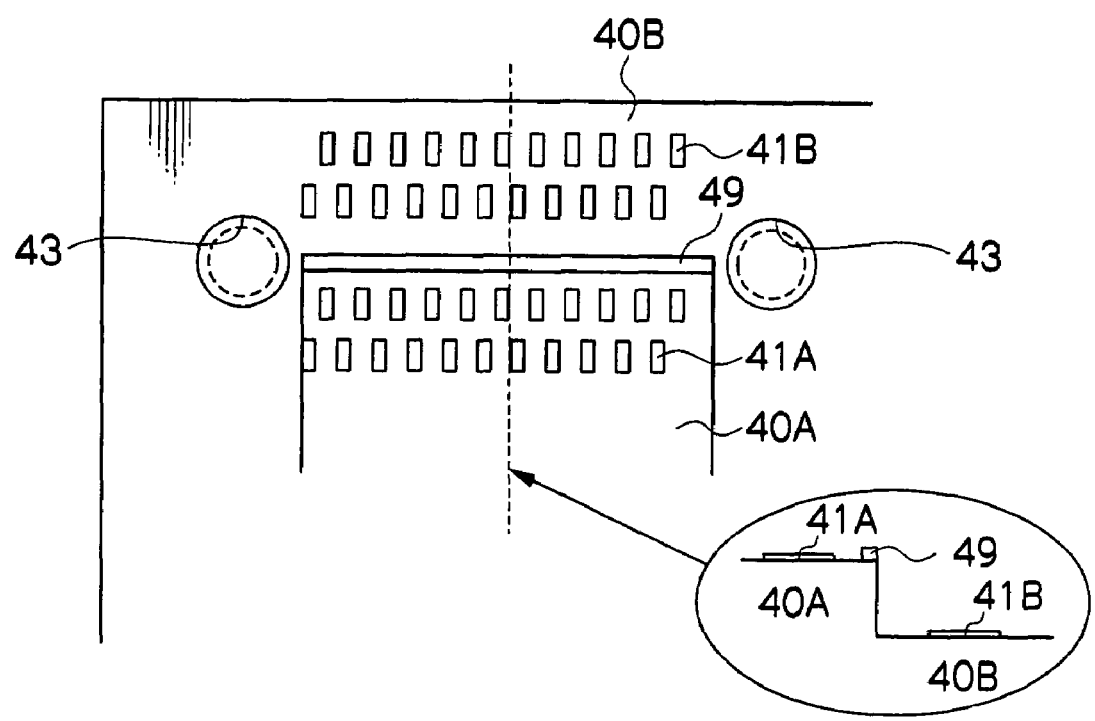
FIG. 22B is a plan diagram showing another example of the connection terminal of the image display medium pertaining to the fifth exemplary embodiment and the connector that connects to the connection terminal.

Further, as shown in FIG. 22A, guide pins 302 that are inserted into the guide holes 43 in the image display medium 108 may be erectly disposed on the surface of the connector 300 that connects to the connection terminal 40, and as shown in FIG. 22B, a positioning rib 49 may be disposed at the boundary between the column connection terminal 40A and the row connection terminal 40B of the connection terminal 40, and a positioning groove 304 that engages with the positioning rib 49 may be disposed between the column connection portion 300A and the row connection portion 300B. Because it is necessary to dispose a gap of about 100 μm between the guide pins 302 and the guide holes 43 so that the guide pins 302 can be easily inserted into the guide holes 43, the positions of the connector 300 and the connection terminal 40 in the longitudinal direction of FIG. 22A and FIG. 22B are aligned by the positioning rib 49 and the positioning groove 304. It will be noted that, even if their positions in the lateral direction of FIG. 22A and FIG. 22B shift, just the pixel positions shift, so it does not become that great of a problem. When the connector 300 shown in FIG. 22A and FIG. 22B is to be attached to the connection terminal 40 shown in FIG. 22B, the guide pins 302 of the connector 300 are inserted into the guide holes 43 in the image display medium 108 as shown in FIG. 23A. Then, as shown in FIG. 23B, the positioning groove 304 is caused to engage with the positioning rib 49. Thus, the connector 300 and the connection terminal 40 are reliably positioned.

Figure 24A:
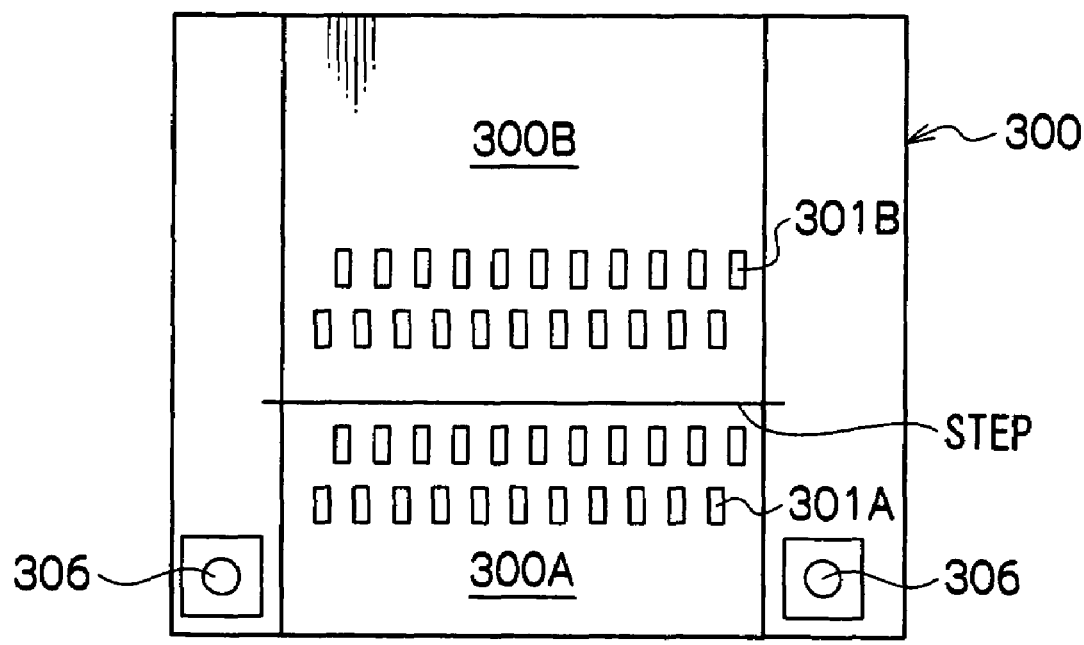
FIG. 24A is a plan diagram showing yet another example of the connection terminal of the image display medium pertaining to the fifth exemplary embodiment and the connector that connects to the connection terminal.
Figure 24B:
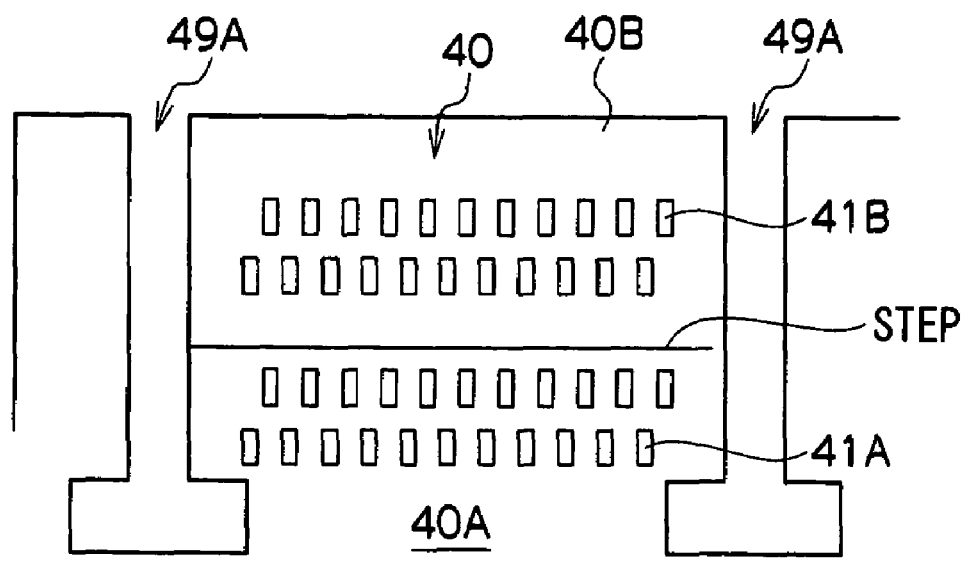
FIG. 24B is a plan diagram showing yet another example of the connection terminal of the image display medium pertaining to the fifth exemplary embodiment and the connector that connects to the connection terminal.
Figure 25A:
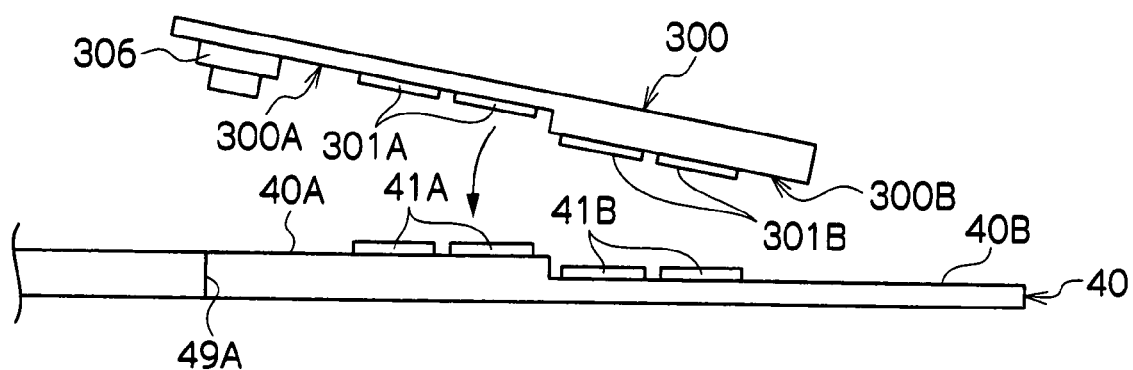
FIG. 25A is an explanatory diagram showing the connector shown in FIG. 24A and FIG. 24B being connected to the connection terminal.
Figure 25B:
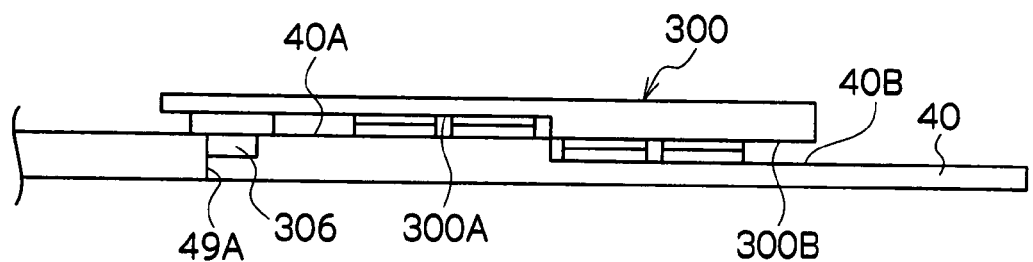
FIG. 25B is an explanatory diagram showing the connector shown in FIG. 24A and FIG. 24B being connected to the connection terminal.

Moreover, as shown in FIG. 24A, bushes 306 may be erectly disposed on the surface of the connector 300 that connects to the connection terminal 40, and as shown in FIG. 24B, cut-ins 49A may be disposed in the connection terminal 40 so as to sandwich the column connection terminal 40A and the row connection terminal 40B, so that the bushes 306 are guided by the cut-ins 49A as shown in FIG. 25A and the steps in the connector 300 and the connection terminal 40 are caused to engage with each other as shown in FIG. 25B to perform positioning in the insertion direction.

In the image display medium 108, a step is formed between the column connection terminal 40A and the row connection terminal 40B of the connection terminal 40, and a step is also formed between the column connection portion 300A and the row connection portion 300B of the connector 300 that connects to the image display medium 108, and this step engages with the step in the connection terminal 40. Consequently, the terminals 301B of the column connection portion 300B can be effectively prevented from contacting the terminals 41A of the column connection terminal 40A, and the terminals 301A of the column connection portion 300A can be effectively prevented from contacting the terminals 41B of the row connection terminal 40B.

It will be noted that, instead of disposing the first electrical contact group at a position where it does not overlap the display region of the image display medium as described in the above-mentioned exemplary embodiments, the first electrical contact group may also be disposed at a position where it overlaps the display region at the surface opposite to the side where an image in the display region is viewed. In this case, the display region and the frame portion to which the electrical connection connector connects overlap.

The foregoing descriptions of the exemplary embodiments of the present invention have been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display medium comprising:
a display layer including a display region whose display state changes by electrical action;
a pair of substrates that retain the display layer therebetween, with at least part of the pair of substrates configuring a frame portion to which an electrical connection connector for electrical connection to the outside connects, and with at least one of the pair of substrates being transparent;
a first scan electrode group that is a group of electrodes disposed across the overall display region along a column direction of the display region on the surface of one of the pair of substrates facing the display layer;
a second scan electrode group that is a group of electrodes disposed across the overall display region along a row direction of the display region on the surface of the other of the pair of substrates facing the display layer;

a first electrical contact group disposed at a place on the pair of substrates to which the electrical connection connector connects;

a second electrical contact group disposed at a place on the pair of substrates to which the electrical connection connector connects;

a first connection wire group that electrically connects the first electrical contact group and the first scan electrode group to each other; and a second connection wire group that electrically connects the second electrical contact group and the second scan electrode group to each other, wherein the first electrical contact group and the second electrical contact group are disposed apart from each other a distance that is greater than the distance between two mutually adjacent contacts belonging to the first electrical contact group or the second electrical contact group along at least one of a thickness direction and a surface direction of the pair of substrates.

2. The image display medium of claim 1, wherein the first electrical contact group and the second electrical contact group are formed on the same surface side and are disposed separate from each other along the thickness direction, with a step being formed therebetween.

3. The image display medium of claim 1, wherein a plurality of contacts that configure at least one of the first electrical contact group and the second electrical contact group are two-dimensionally disposed on the same surface of the substrates.

4. The image display medium of claim 2, wherein at least parts of the first connection wire group and the second connection wire group are formed inside the frame portion of the pair of substrates, and the first connection wire group and the second connection wire group are formed separate from each other in the thickness direction of the frame portion with the first connection wire group being formed on the side of the frame portion where the first electrical contact group is formed and the second connection wire group being formed on the side of the frame portion where the second electrical contact group is formed.

5. The image display medium of claim 2, wherein the first scan electrode group is disposed on a substrate of the pair of substrates on an image viewing side where an image formed in the display region is viewed, the second scan electrode group is disposed on a substrate of the pair of substrates on the opposite side of the image viewing side, and at least part of the first connection wire group is disposed on the opposite side of the side where the second scan electrode group is disposed.

6. The image display medium of claim 2, wherein the first electrical contact group and the second electrical contact group are disposed separate from each other along the surface direction.

7. The image display medium of claim 1, wherein the frame portion includes a plurality of through holes through which a plurality of guide pins disposed on the electrical connection connector pass.

8. The image display medium of claim 1, wherein the through holes are formed at positions away from an extension line of a step between the first electrical contact group and the second electrical contact group.

9. The image display medium of claim 1, wherein a image selection drive circuit that selects electrodes in the first scan electrode group and the second scan electrode group and controls the display state of the display region is disposed on the outside, is connected to the first scan electrode group via the electrical connection connector, the first electrical contact group, and the first connection wire group, and is connected to the second scan electrode group via the electrical connection connector, the second electrical contact group, and the second connection wire group.

10. An image display medium comprising:

a display layer including a display region whose display state changes by electrical action;

a pair of substrates that retain the display layer therebetween, with at least parts of the pair of substrates configuring a frame portion to which an electrical connection connector for electrical connection to the outside connects, and with at least one of the pair of substrates being transparent;

a first scan electrode group that is a group of electrodes disposed across the overall display region along a column direction of the display region on the surface of one of the pair of substrates facing the display layer;

a second scan electrode group that is a group of electrodes disposed across the overall display region along a row direction of the display region on the surface of the other of the pair of substrates facing the display layer; and an electrical contact group that is disposed at a place on the pair of substrates to which the electrical connection connector connects and is electrically connected to the first and second scan electrode groups, wherein the electrical contact group is divided into a plurality of regions by a step in a thickness direction.

11. An image writing device for causing the image display medium of claim 2 to display an image, the image writing device comprising:

a signal processor that generates a control signal that selects electrodes in the first scan electrode group and the second scan electrode group with which the image display medium is disposed;

an electrical connection connector that connects to the image display medium;

a contact terminal group that is disposed on the electrical connection connector, is electrically connected to the first electrical contact group and the second electrical contact group with which the image display medium is disposed when the electrical connection connector is connected to the image display medium, and supplies the control signal generated by the signal processor to the first scan electrode group and the second scan electrode group; and a positioning portion that is disposed on the electrical connection connector and engages with the step in the image display medium to regulate the positional relationship between the image display medium and the electrical connection connector when the electrical connection connector is connected to the image display medium.

12. The image writing device of claim 11, wherein an anisotropic conductive material that conducts electricity only in the thickness direction is disposed on the side of the contact terminal group with which the electrical connection connector is disposed that connects to the first electrical contact group and the second electrical contact group.

13. An image forming apparatus comprising:

the image display medium of claim 2; and an image writing device for causing the image display medium to display an image, the image writing device comprising:

a signal processor that generates a control signal that selects electrodes in the first scan electrode group and the second scan electrode group with which the image display medium is disposed;

an electrical connection connector that connects to the image display medium;

a contact terminal group that is disposed on the electrical connection connector, is electrically connected to the first electrical contact group and the second electrical contact group with which the image display medium is disposed when the electrical connection connector is connected to the image display medium, and supplies the control signal generated by the signal processor to the first scan electrode group and the second scan electrode group; and a positioning portion that is disposed on the electrical connection connector and engages with the step in the image display medium to regulate the positional relationship between the image display medium and the electrical connection connector when the electrical connection connector is connected to the image display medium, and wherein the image writing device electrically connects to the image display medium and causes the image display medium to display an image.

14. An image forming apparatus comprising:

the image display medium of claim 2; and an image writing device for causing the image display medium to display an image, the image writing device comprising:

a signal processor that generates a control signal that selects electrodes in the first scan electrode group and the second scan electrode group with which the image display medium is disposed;

an electrical connection connector that connects to the image display medium;

a contact terminal group that is disposed on the electrical connection connector, is electrically connected to the first electrical contact group and the second electrical contact group with which the image display medium is disposed when the electrical connection connector is connected to the image display medium, and supplies the control signal generated by the signal processor to the first scan electrode group and the second scan electrode group; and a positioning portion that is disposed on the electrical connection connector and engages with the step in the image display medium to regulate the positional relationship between the image display medium and the electrical connection connector when the electrical connection connector is connected to the image display medium, and wherein an anisotropic conductive material that conducts electricity only in the thickness direction is disposed on the side of the contact terminal group with which the electrical connection connector is disposed that connects to the first electrical contact group and the second electrical contact group, and wherein the image writing device electrically connects to the image display medium and causes the image display medium to display an image.

* * * * *